(12) United States Patent
Slobodan et al.

(10) Patent No.: US 10,690,626 B2
(45) Date of Patent: Jun. 23, 2020

(54) CASSETTES FOR USE IN AUTOMATED PARALLEL ELECTROPHORETIC ASSAYS AND METHODS FOR MANUFACTURING AND USING SAME

(71) Applicant: Coastal Genomics Inc., Burnaby (CA)

(72) Inventors: Jared Slobodan, Richmond (CA);
Matthew Nesbitt, Langley (CA);
Andrew Nobles, Vancouver (CA);
Kevin Baillie, Vancouver (CA)

(73) Assignee: COASTAL GENOMICS INC., Burnaby, British Columbia (CA)

( * ) Notice: Subject to any disclaimer, the term of this patent is extended or adjusted under 35 U.S.C. 154(b) by 280 days.

(21) Appl. No.: 15/111,744

(22) PCT Filed: Jan. 16, 2015

(86) PCT No.: PCT/CA2015/050031
§ 371 (c)(1),
(2) Date: Jul. 14, 2016

(87) PCT Pub. No.: WO2015/106356
PCT Pub. Date: Jul. 23, 2015

(65) Prior Publication Data
US 2016/0334365 A1 Nov. 17, 2016

Related U.S. Application Data

(60) Provisional application No. 61/929,009, filed on Jan. 17, 2014.

(51) Int. Cl.
*G01N 27/447* (2006.01)
*G01N 27/26* (2006.01)

(52) U.S. Cl.
CPC . *G01N 27/44782* (2013.01); *G01N 27/44739* (2013.01); *G01N 27/44743* (2013.01)

(58) Field of Classification Search
CPC ........... G01N 27/44782; G01N 27/447; G01N 27/44739; G01N 27/44743
See application file for complete search history.

(56) References Cited

U.S. PATENT DOCUMENTS 6,569,306 B1 5/2003 Read et al.
6,905,585 B2 6/2005 Goncalves
(Continued)

FOREIGN PATENT DOCUMENTS

CA 2393690 A1 6/2001
EP 0457526 A2 11/1991
(Continued)

OTHER PUBLICATIONS

European Patent Office, Supplementary European Search Report, Application No. EP 15737241, dated Aug. 18, 2017, 4 pages.

*Primary Examiner* — Susan D Leong
(74) *Attorney, Agent, or Firm* — Quarles & Brady LLP

(57) ABSTRACT

A cassette for use in parallel electrophoretic assays and methods of manufacture and use of same are provided. The cassette comprises assay channels suitable for carrying out electrophoresis and sample ports for introducing samples into the assay channels. Each sample port comprises one or more tip registration features for guiding a pipette tip to a desired location, which corresponds to the position of a well for receiving the sample. The cassette is particularly suited for use with automated liquid handling systems.

26 Claims, 22 Drawing Sheets

(56) References Cited

U.S. PATENT DOCUMENTS

| | | | |
|---|---|---|---|
| 7,407,630 B2 | 8/2008 | Reed et al. | |
| 2003/0072684 A1* | 4/2003 | Anderson | B01L 9/54 |
| | | | 422/400 |
| 2004/0091398 A1 | 5/2004 | Gilbert et al. | |
| 2005/0217997 A1* | 10/2005 | Goncalves | G01N 27/44704 |
| | | | 204/616 |
| 2006/0207882 A1 | 9/2006 | Ben-Asouli et al. | |

FOREIGN PATENT DOCUMENTS

| | | | |
|---|---|---|---|
| WO | 9506243 | A1 | 3/1995 |
| WO | 9828617 | A1 | 7/1998 |
| WO | 0218901 | A2 | 3/2002 |
| WO | 02077630 | A1 | 10/2002 |
| WO | 2010126897 | A1 | 11/2010 |

\* cited by examiner

CASSETTES FOR USE IN AUTOMATED PARALLEL ELECTROPHORETIC ASSAYS AND METHODS FOR MANUFACTURING AND USING SAME

CROSS REFERENCE TO PRIOR APPLICATIONS

This application claims priority to U.S. Provisional Patent Application 61/929,009, which is incorporated herein by reference.

FIELD OF THE DISCLOSURE

The present disclosure relates to an electrophoresis gel cassette for use in electrophoresis and to the use and manufacture thereof. More particularly, the present disclosure relates to an electrophoresis gel cassette suitable for use with an automated liquid handling device.

BACKGROUND OF THE DISCLOSURE

Automated liquid handling workstations may be used, for example, in applications involving repetitive, predictable pipetting operations. Automation of repetitive pipetting operations may facilitate higher throughput, lower operating costs, and/or, improved consistency in pipetting. However, laboratory protocols involving, for example, non-standardized labware, gelatinous media, and/or other non-standard pipetting target areas may not be well suited to automation. In such cases, an liquid handling by an individual practitioner may be advantageous relative to an automated machine, at least because an individual could see the target and make real time positional corrections to the position and directional movement of a pipette tip to ensure the pipette tip orifice is located in a desired position prior to aspirate and dispense operations. For example, known liquid handling devices are not desirable for use in loading samples into one or more wells of an agarose gel, at least due to the small size of the wells and the low rigidity of the walls that define the agarose wells.

When pipette tips are loaded onto a manual pipette or onto mandrels of a liquid handling device, there is typically variation in 'straightness' of tips relative to their respective shaft or mandrel (i.e., the longitudinal axis of the tip may not be in line with the intended longitudinal axis of the tip). Such variation in straightness is known in the art as "tip splay". Without positional feedback provided by a manual practitioner, the presence of tip splay means that the size of a well that can be accurately targeted using an automated system is larger relative to the size of a well that can be accurately targeting using manual pipetting. Further, off-target insertion of a pipette tip into a wall defining an agarose well or into the agarose surrounding a well orifice may damage the well and/or plug the pipette tip with agarose, thereby interfering with subsequent aspiration or dispensing.

One mechanism to account for tip splay on a single channel pipetting head is to utilize a sensor that can provide feedback regarding the position of the tip. However, such a sensor would not be useful with a multichannel pipetting head comprising mandrels at fixed spacing, at least because the direction of tip splay may differ between tips, meaning that a single positional adjustment could not account for the splay in each tip.

There are examples of products and devices designed to address one or more of the above challenges associated with automated pipetting of samples into agarose gels. For example, the EGel™ 96 agarose gel (Invitrogen) comprises 96 preformed wells in a staggered pattern and is designed for use with an automatic 96 channel liquid handling manifold. Rather than inserting sample-bearing pipette tips into the wells of the agarose gel, pipette tips are positioned above the wells of the EGel and dispensed. The dispensed sample is then drawn into a section of the well that is adjacent to the position of the tip by capillary action. Thus, the EGel would seem to overcome the issue of inserting the pipette tip into the gel, as the pipette tip remains above the upper surface of the gel. Further, each well of an EGel is relatively large, consisting of a shoulder zone and an adjacent compartment that draws dispensed fluid into the wells. The relatively large wells may address tip splay, by providing a larger target for each pipette tip. However, the larger size of the wells in the EGel prevents maximization of the number of wells that can be positioned adjacent to one another in a gel, thereby limiting sample throughput.

It is desirable to mitigate and/or obviate one or more of the above deficiencies.

SUMMARY OF THE INVENTION

In a first aspect, a cassette for use in parallel electrophoretic assays is provided. In one embodiment, the cassette comprises a tray, the tray having a floor and two pairs of opposing side walls extending upwards from the floor, the tray at least partially defining a plurality of assay channels. Each of the assay channels comprises a first buffer reservoir; a second buffer reservoir; and a media channel, the media channel extending between, and in fluid communication with, the first and second buffer reservoirs. In this embodiment, the cassette further comprises a lid, the lid adapted to engage the side walls of the tray, thereby creating a space between the tray floor and the lid, the lid comprising a plurality of ports, each of the ports extending from an outer surface of the lid to an inner surface of the lid. The plurality of ports comprise a plurality of buffer reservoir ports for introducing and/or removing buffer; and a plurality of sample ports for introducing a plurality of samples into the media channels, each of the plurality of sample ports comprising one or more tip registration features for guiding a pipette tip to a desired location in the sample port. In this embodiment, when the lid is engaged with the tray, the buffer reservoir port is in fluid communication with one or more of the first and second buffer reservoirs, the plurality of sample ports are aligned with the plurality of media channels.

In one embodiment of the first aspect, the lid further comprises a plurality of media ports for introducing media into the media channels.

In one embodiment of the first aspect, the one or more tip registration features comprise at least one surface extending in one or more of x- and y-axes towards the desired location in the sample port, the x- and y-axes being in line with the plane of the lid. In a preferred embodiment, the at least one surface of the one or more registration features comprises a sloped surface for receiving a pipette tip.

In one embodiment of the first aspect, each of the plurality of sample ports comprises a tip landing zone. In a preferred embodiment, the tip landing zone is adjacent to the desired location in the sample port. In a preferred embodiment, the at least one surface of the one or more registration features comprises a projection extending into the sample port from a wall in the sample port opposite the tip landing zone.

In one embodiment of the first aspect, the cassette further comprises a gel medium, the gel medium being disposed in the media channels of the tray, the gel medium in each media channel comprising a well for receiving a sample, wherein, when the lid is engaged with the tray, each well is aligned with the desired location in one of the plurality of sample ports. In a preferred embodiment, the cassette further comprises a buffer, the buffer being disposed in the first and second buffer reservoirs. In a preferred embodiment, the gel medium in each media channel further comprises a tip landing zone adjacent to the well for receiving a sample.

In one embodiment of the first aspect, the plurality of ports further comprises: a plurality of barrier ports for positioning at least a portion of first and second barriers into each of the assay channels, wherein, when the lid is engaged with the tray, the plurality of barrier ports facilitate positing of the first and second barriers between the first buffer reservoir and the media channel and the second buffer reservoir and the media channel, respectively. In a preferred embodiment, the plurality of ports further comprises: a plurality of sample extraction ports for extracting a plurality of samples from the media channel, each of the plurality of sample extraction ports comprising one or more tip registration features for guiding a pipette tip to a second desired location in the sample extraction port. In a preferred embodiment, each of the plurality of sample extraction ports comprises a tip landing zone. In a preferred embodiment, the tip landing zone is adjacent to the desired location in the sample port.

In one embodiment, the gel medium in each media channel further comprises a second well for extracting a sample. In a preferred embodiment, the gel medium in each media channel further comprises a tip landing zone adjacent to the well for extracting a sample.

In one embodiment, the plurality of assay channels comprises 6, 12, 24, 48 or 96 assay channels.

In a second aspect, a method for manufacturing various embodiments of the cassette provided herein is provided. In one embodiment, the method comprises: forming the tray and lid from an optically neutral material; positioning a first removable barrier between the first buffer reservoir and the media channel in each of the assay channels of the formed tray and a second removable barrier between the second buffer reservoir and the media channel in each of the assay channels of the formed tray; introducing media into each media channel in the plurality of assay channels of the formed tray; positioning a comb into the introduced media in each media channel, each tooth in the comb configured to form a well in each media channel upon gelification of the media; introducing buffer into each first and second buffer reservoir in each assay channel of the formed tray; removing the comb from the introduced media after gelification of the introduced media; removing the barrier after gelification of the media; engaging the formed lid on the side walls of the formed tray, thereby creating a space between the floor of the formed tray and the lid, the space being occupied at least partially by the introduced media and the introduced buffer.

In one embodiment of the first aspect, the engaging step is completed prior to the positioning of the first and second removable barriers, the introducing of media, the positioning of the comb and the introducing of the buffer.

In one embodiment of the first aspect, the first and second removable barriers do not sealably separate the first buffer reservoir from the media channel and the second buffer reservoir from the media channel, respectively, in each of the assay channels of the manufactured tray.

In one embodiment of the first aspect, the introduction of the media and the introduction of the buffer are carried out substantially simultaneously.

In a third aspect, a method of using various embodiments of the cassette provided herein is provided. In one embodiment, the method comprises: positioning the cassette in a liquid handling device; inserting a plurality of pipette tips in the tip landing zones of the plurality of sample ports, the plurality of pipette tips corresponding to the plurality of sample ports; moving the plurality of pipette tips inserted in the tip landing zones in one or more axes towards one or more of the tip registration features, the one or more axes being co-planar with the plane of the cassette lid; registering the plurality of pipette tips against the one or more tip registration tip features, at least one of the one or more tip registration features per sample port being adjacent to the desired location in each of the sample ports; and dispensing a plurality of samples from the plurality of pipette tips registered against the registration features adjacent to the desired location in each of the sample ports.

In one embodiment of the third aspect, the method further comprises lowering the plurality of registered pipette tips into the corresponding wells for receiving a sample prior to dispensing the plurality of samples.

In one embodiment of the third aspect, the method further comprises engaging the cassette comprising the plurality of dispensed samples with electrodes and a power supply, thereby creating one or more electric fields in the cassette, the one or more electric fields being sufficient to case migration of the plurality of samples through the gelified media in the plurality of assay channels.

In one embodiment of the third aspect, the method further comprises extracting a plurality of migrated samples from the cassette following exposure to the electric field.

In one embodiment, the extracting comprises: inserting a second plurality of pipette tips in the second tip landing zones of the plurality of sample extraction ports, the second plurality of pipette tips corresponding to the plurality of sample extraction ports; moving the second plurality of pipette tips inserted in the second tip landing zones in one or more axes towards one or more of the second tip registration features, the one or more axes being co-planar with the plane of the cassette lid; registering the second plurality of pipette tips against the one or more second tip registration tip features, at least one of the one or more second tip registration features per sample extraction port being adjacent to the second desired location in each of the sample extraction ports; moving the registered second plurality of pipette tips downward into the gelified media below the second desired location in each of the sample ports; aspirating a the plurality of migrated samples from the gelified media below the second desired location in each of the sample ports; and retracting the second plurality of pipette tips from the gelified media and the sample ports of the cassette.

BRIEF DESCRIPTION OF THE DRAWINGS

The features of the invention will become more apparent in the following detailed description in which reference is made to the appended drawings wherein.

DETAILED DESCRIPTION OF THE INVENTION

Unless defined otherwise, all technical and scientific terms used herein have the same meaning as commonly understood by one of ordinary skill in the art to which this invention belongs.

Cassettes

The present disclosure is generally directed to a cassette for use in parallel electrophoretic assays, and more particularly to a cassette for use in automated parallel electrophoretic assays.

Liquid handling systems are configured to manipulate a plurality of fluid samples, automatically and concurrently, enabling high-throughput operations. Liquid handling devices are marketed as being highly reliable and accurate. However, sometimes a device may malfunction during the liquid handling process or not perform to a user's expectations. For example, a sample may not be properly loaded into a well in an electrophoresis gel because one or more pipette tips may not be aligned with a well. Such a malfunction may lead to inaccurate or misleading results.

In one aspect, the cassette provided herein may be used with an automated liquid handling device to guide a plurality of pipette tips to a desired location relative to the cassette, such as, for example, above a plurality of wells for receiving samples in a gel disposed in the cassette.

In general, various embodiments of the cassette provided herein comprise a tray portion, which functions as a base for the cassette and at least partially defines a plurality of assay channels, and a lid portion, which functions as a cover for the tray. The lid and tray portions may be discrete components or may be integral with each other.

In general, each assay channel in the cassette comprises an elongate media channel separating, but in fluid communication with (during functional operation of the cassette), a pair of spaced apart buffer reservoirs (i.e., first and second buffer reservoirs), which are functionally identical unless otherwise indicated. While the tray may define substantially all aspects of the assay channels, such arrangement is not considered to be necessary to the use or functionality of the various invention embodiments. In some embodiments, various features of the lid and tray together may together define the assay channels of the cassette.

Figure 1:
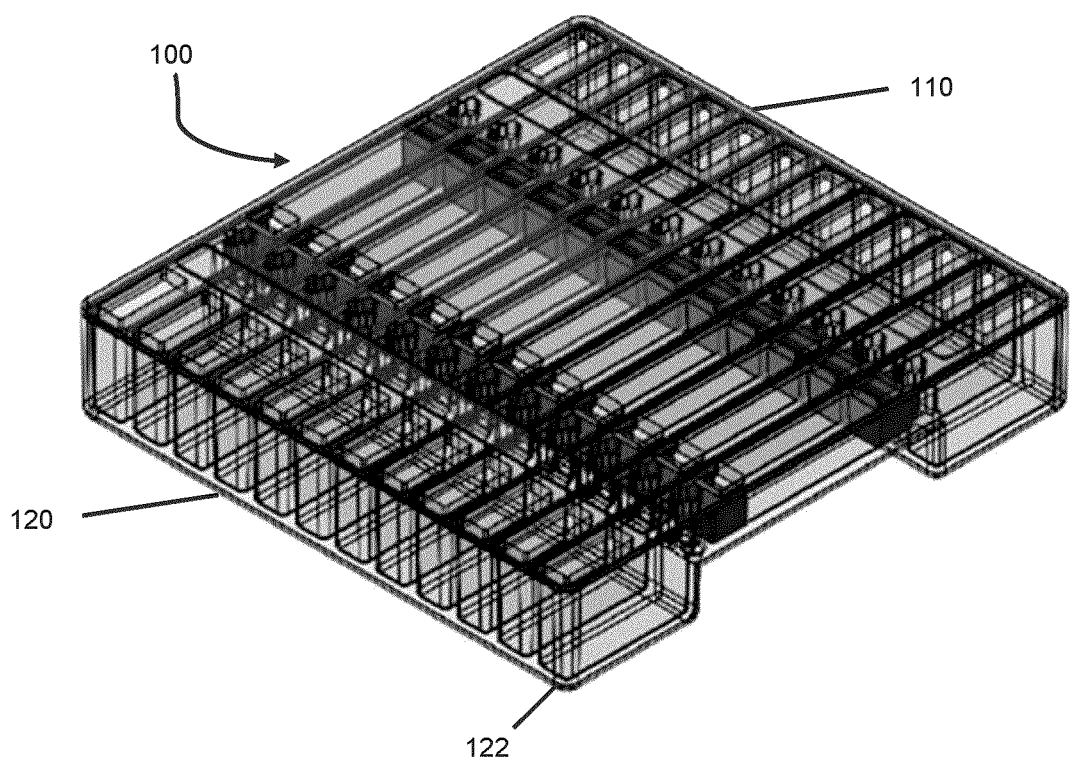
FIG. 1 is a perspective view of a first embodiment of cassette according to the invention wherein obscured portions thereof are shown in phantom.

Referring to FIG. 1, which illustrates one embodiment of a cassette provided herein, the cassette 100 comprises a tray 120 and a lid 110. The tray 120 has a floor 122 and two pairs of opposing side walls extending upwards from the floor 122. The lid 110 is adapted to engage the side walls of the tray 120, thereby creating a space between the tray floor 122 and the lid 110. For example, a lid may be adapted to engage a tray via mating parts (e.g., tongue and groove features), but such mating parts are not required. An electrophoresis gel and buffer may be disposed in the space between the tray floor 122 and the lid 110, as described further below. The cassette 100 may be configured for communication with electrodes for use in one or more electrophoretic assays.

Figure 2:
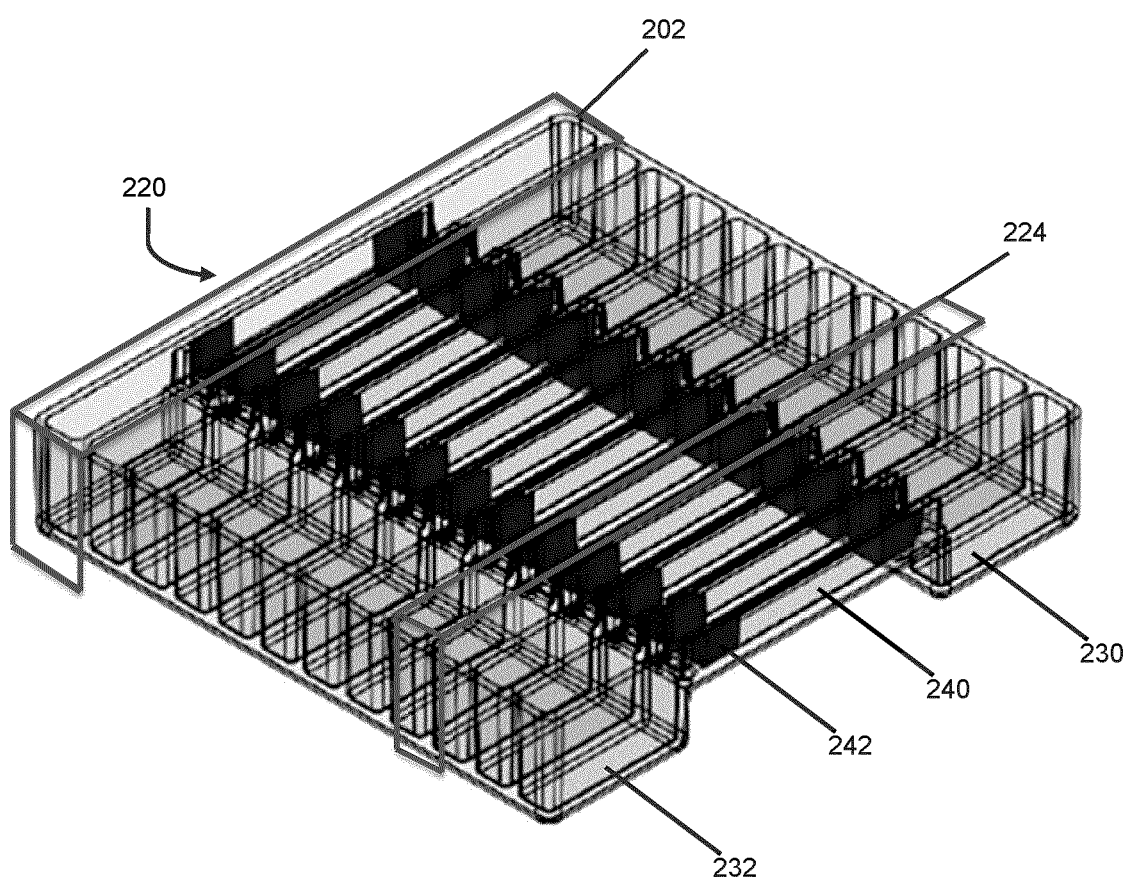
FIG. 2 is a perspective view of the tray portion of the cassette of FIG. 1, wherein obscured portions thereof are shown in phantom.

Referring to FIG. 2, which illustrates the tray of the cassette provided in FIG. 1, the tray 220 tray at least partially defines a plurality of assay channels 202. Twelve assay channels 202 are at least partially defined by the tray 220 of FIG. 2. However, in other embodiments of the cassette provided herein, various numbers of assay channels 202 may be at least partially defined by a tray of the cassette (e.g., 6, 12, 24, 48, 96 or more assay channels). Each of the assay channels 202 comprises a first buffer reservoir 230 and a second buffer reservoir 232 for receiving and holding buffer (e.g., buffer suitable for use in an electrophoretic assay). Each of the assay channels 202 further comprises a media channel 240 extending between the first and second buffer reservoirs 230, 232. Each media channel 240 is in fluid communication with the first and second buffer reservoirs 230, 232, such that in use, an electric field may be applied to the cassette, such that the field is present throughout each assay channel 202 in the cassette.

Referring further to FIG. 2, the tray 220 comprises a plurality of walls 224 extending upwards from the floor of the first and second buffer 230, 232 portions of the tray and the media channel 240 portions of the tray. These walls 224 separate one assay channel 202 from another, thereby inhibiting fluid and optionally electric communication between the assay channels 202.

In one preferred embodiment, various portions of surfaces in the media channels 240 may be textured 242, as discussed further below.

Figure 3:
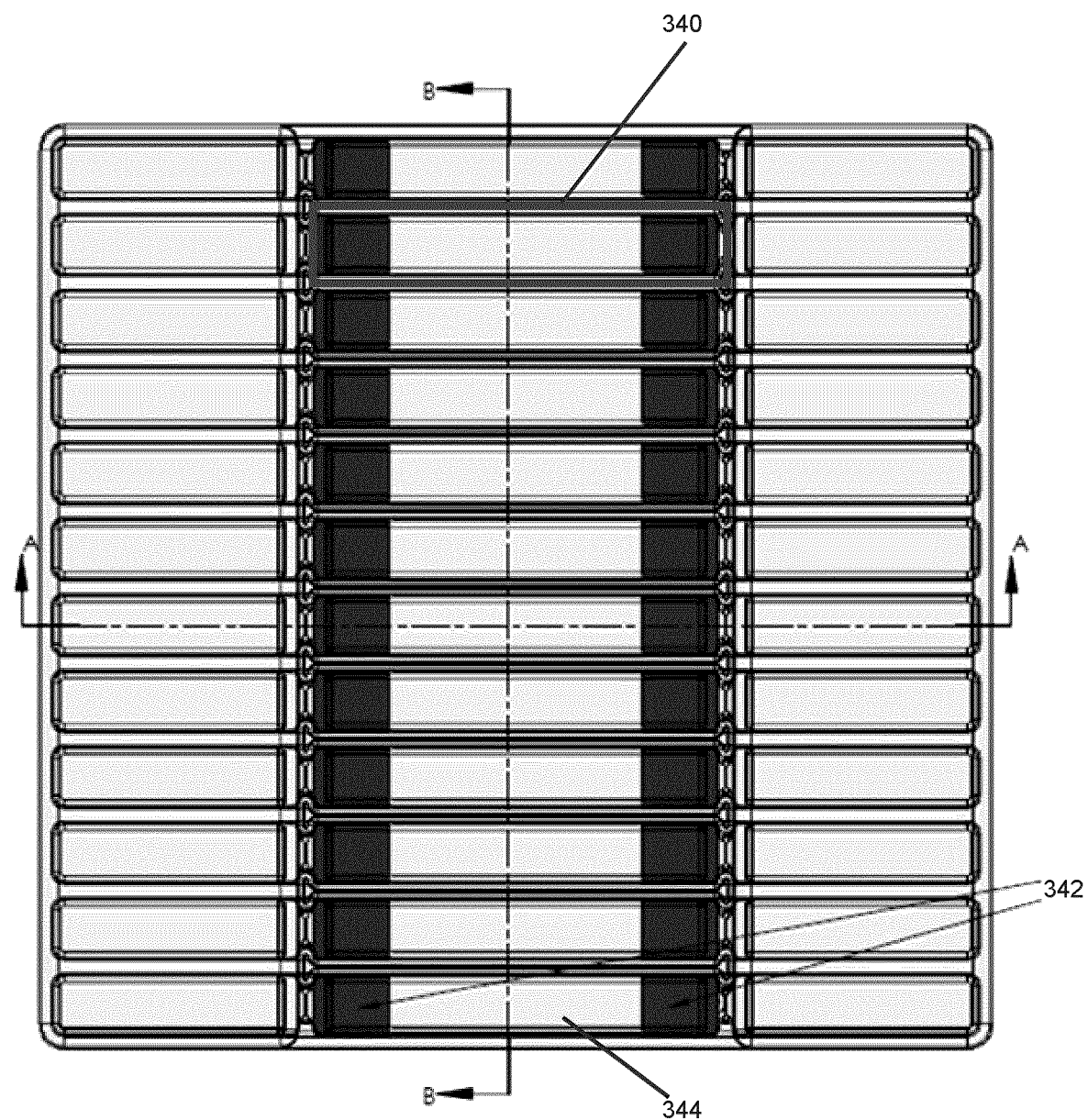
FIG. 3 is a top plan view of the tray of FIG. 2.
Figure 3A:
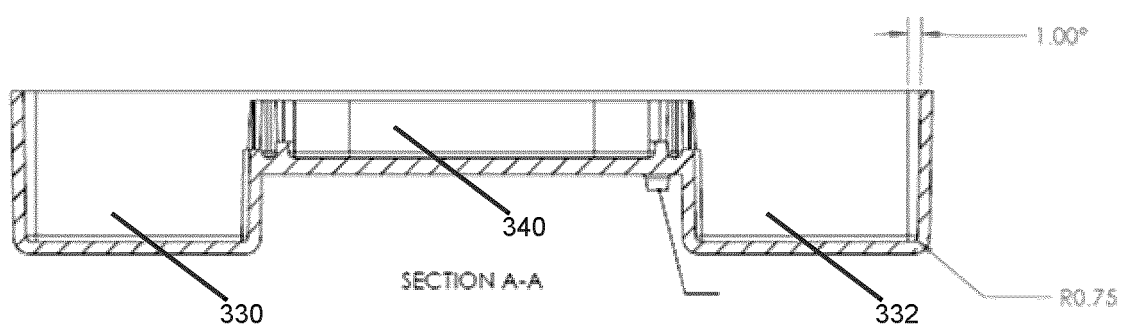
FIG. 3A is a side elevation in cross section taken substantially along the line A-A of FIG. 3.
Figure 3B:
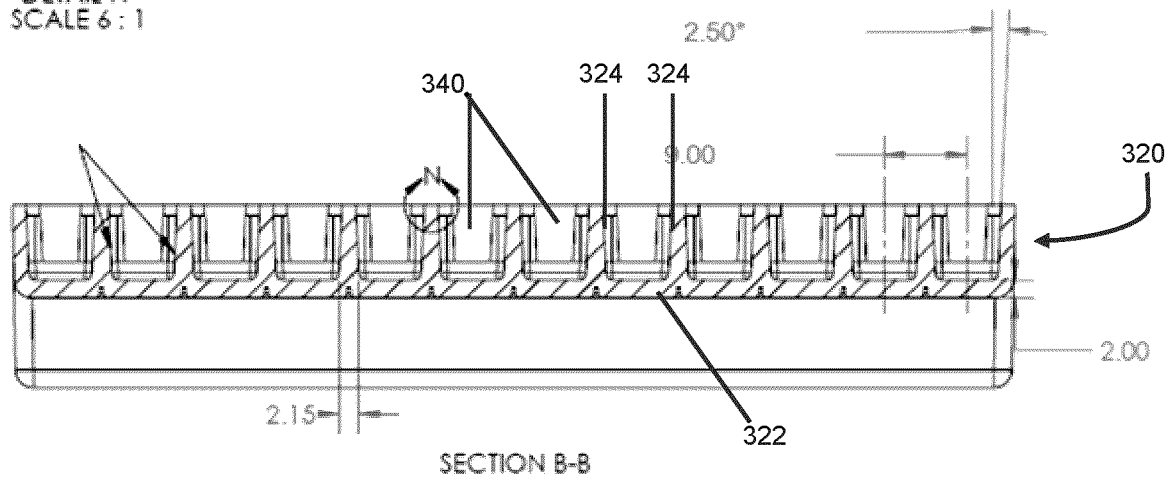
FIG. 3B is a side elevation in cross section taken substantially along the line B-B of FIG. 3.
Figure 3B:
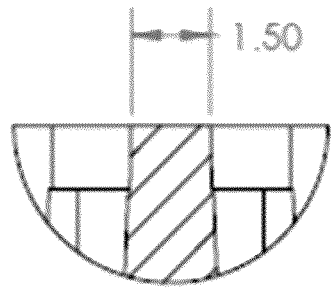

Referring to FIG. 3, which illustrates one embodiment of the tray of the cassette provided herein, some portions of the media channels 340 comprise a non-smooth, textured surface 342, which facilitates improved adherence of a gel medium to the media channels 340 by providing binding sites for the media and/or areas of increased friction between the media and the media channel 340. Other portions of the media channels 340 comprise a substantially smooth surface 344, which facilitates optical transparency of that portion of the media channel 340, thereby facilitating imaging of the media channel is desired by a user. FIG. 3A illustrates a side elevation cross-sectional view taken along the line A-A of the tray of FIG. 3, which depicts a single assay channel comprising first and second buffer reservoirs 330, 332 and a media channel 340 extending between, and in fluid communication with, the first and second buffer reservoirs 330, 322. FIG. 3B illustrates a side elevation cross-sectional view taken along the line B-B of the tray of FIG. 3, which depicts 12 media channels 340, the media channels 340 being separated by walls 324 extending upwards from the floor 322 of the tray 320.

Figure 4:
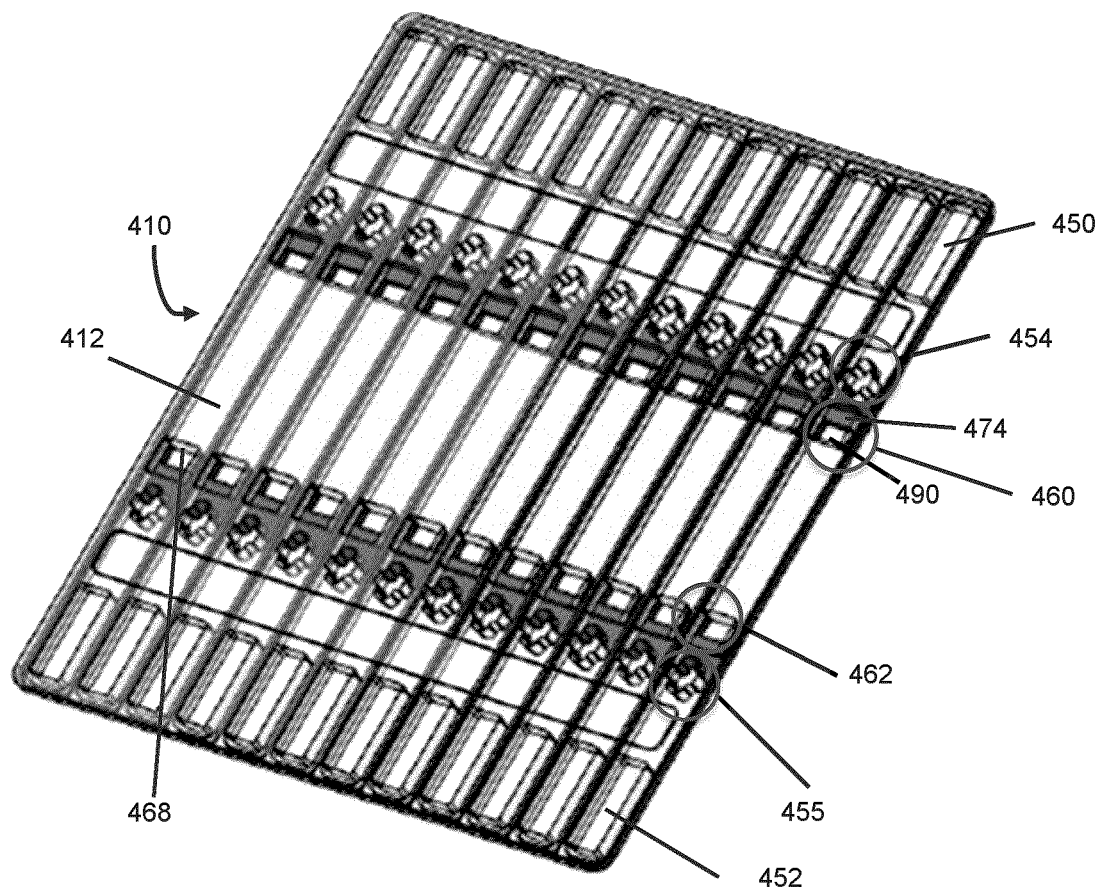
FIG. 4 is a perspective view of a lid portion of the cassette of FIG. 1 wherein obscured portions thereof are shown in phantom.

Referring to FIG. 4, which illustrates the lid of the cassette provided in FIG. 1, the lid 410 comprises a plurality of ports, each of the ports extending from an outer surface of the lid 410 to an inner surface 412 of the lid 410. The function of the plurality of ports is to facilitate the introduction and/or removal of fluids (e.g., media, buffer, samples) and/or electrical current.

In one embodiment, the plurality of ports comprises first and second buffer reservoir ports 450, 452 for introducing and/or removing buffer. In the embodiment shown in FIG. 4, if the lid 410 were engaged with a tray, the first and second buffer reservoir ports 450, 452 would substantially align with first and second buffer reservoirs of a common assay channel in the tray, thereby introduction or removal of buffer to the first and second buffer reservoirs of the assay channel via the first and second buffer reservoir ports 450, 452, respectively. In a preferred embodiment, the first and second buffer reservoir ports 450, 452 may also accommodate removable electrodes for use in electrophoretic operations.

Referring further to FIG. 4, the plurality of ports comprises sample ports 460 for introducing a plurality of samples into the media channels. In the embodiment shown in FIG. 4, if the lid 410 were engaged with a tray, the sample ports 460 would substantially align with a proximal end of a media channel in the tray, and if the tray were to comprise an electrophoresis gel, the sample ports 460 would substantially align with wells for receiving a sample in the gel, thereby facilitating introduction of a sample into a well in a gel disposed in a media channel of the cassette. In one embodiment, the sample ports 460 may also be used for introduction of media into the media channel of each assay channel.

In the embodiment shown in FIG. 4, each of the plurality of sample ports 460 comprises a tip landing zone 474 and one or more tip registration features 468 for guiding a pipette tip to a desired location 490 in the sample port 460.

In general, the tip landing zone is located in an enlarged portion of a sample port, which accommodates initial aberrant pipette tip alignments (i.e., tip splay) such that no pipette tips entering the sample ports are damaged by accidental impingement on the outer surface of the lid of the cassette due to, for example, misalignment. Once partially disposed within the tip landing zone of the enlarged opening, the pipette tips can be laterally moved to contact a tip registration feature, such as, for example, a portion of respective sample port orifice walls and be guided to a desired location in the sample port (e.g., over a sample well in a gel disposed therebelow). The tip landing zone and tip registration features will be discussed further below.

Referring further to FIG. 4, the plurality of ports comprises sample extraction ports 462 for extracting a plurality of samples from the media channels after an electrophoretic assay has been run. In the embodiment shown in FIG. 4, if the lid 410 were engaged with a tray, the sample extraction ports 462 would substantially align with a distal end of a media channel in the tray, thereby facilitating extraction of a sample that has been subjected to electrophoresis in a gel disposed in a media channel of the cassette. In general, sample extraction ports may be located at any location within a media channel that is a distance downstream (i.e., in a direction in which a sample would travel in the media channel when treated by electrophoresis) from a sample port. Sample extraction ports 462 are not required in the cassettes disclosed herein, but may be provided in one or more preferred embodiments of the cassette provided herein.

Referring further to FIG. 4, the plurality of ports further comprises ports referred to as barrier ports 454. In the embodiment shown in FIG. 4, each assay channel comprises two barrier ports 454, 455, a first barrier port 454 being located between the first buffer reservoir port 450 and the sample port 460, a second barrier port 455 being located between the second buffer reservoir port 452 and the extraction port 462. Each barrier port 454, 455 functions to receive a barrier that is used during manufacture of the cassette to separate the first buffer reservoir from the media channel and the second buffer reservoir from the media channel, respectively. In the embodiment shown in FIG. 4, in the absence of a barrier, if the lid 410 were engaged with a tray, the first and second barrier ports 454, 455 would substantially align with portions of the assay channel bridging a media channel and first and second buffer reservoirs respectively, thereby facilitating introduction of media to the media channel and optionally facilitating introduction of buffer to one or more of the buffer reservoirs. Barrier ports 454, 455 are not required in the cassettes disclosed herein (media may be introduced into the media channel by way of, for example, sample ports and/or sample extraction ports), but may be provided in one or more preferred embodiments of the cassette provided herein.

Figure 5:
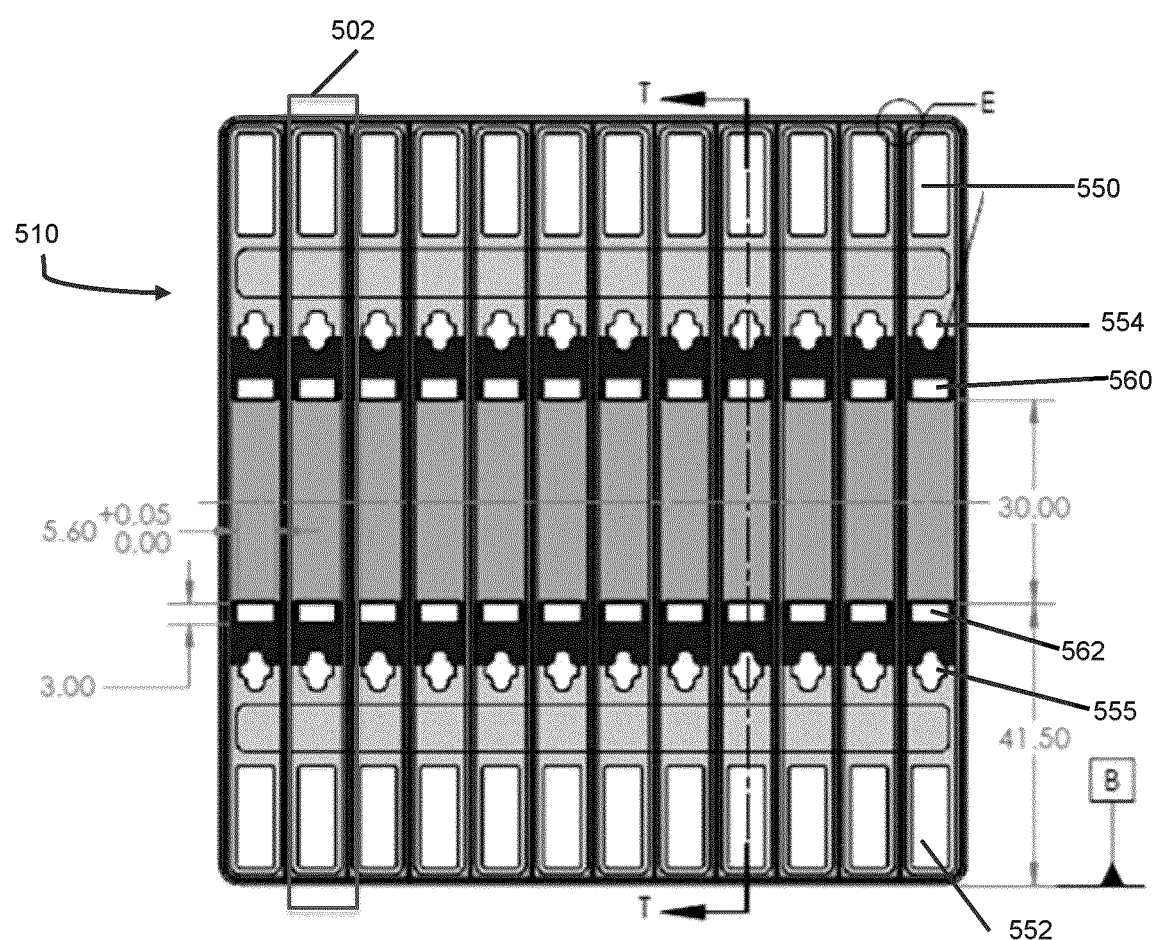
FIG. 5 is a bottom plan view of the lid of FIG. 4.
Figure 5A:
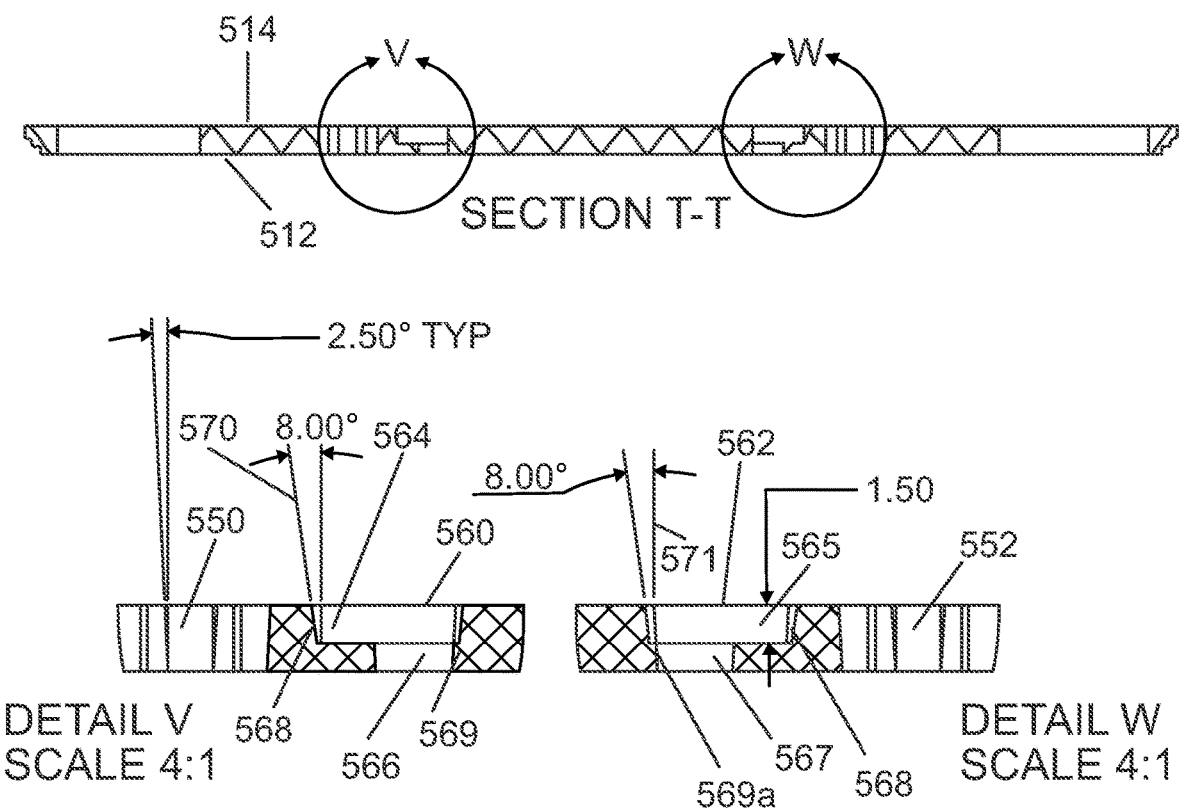
FIG. 5A is a side elevation in cross section taken substantially along the line T-T of FIG. 5 and an enlarged presentation of V and W portions of the lid.
Figure 5B:
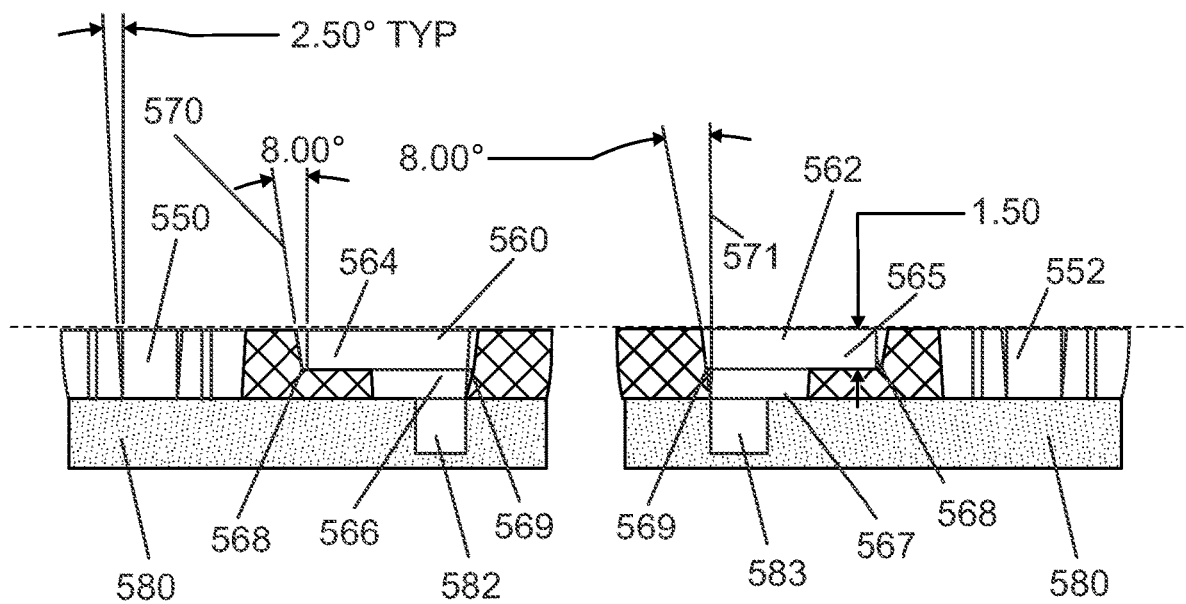
FIG. 5B is an enlarged presentation of the V and W portions of the lid illustrated in FIG. 5A, wherein the lid is provided above a gel comprising wells.

Referring to FIG. 5, which illustrates one embodiment of the lid of the cassette provided herein, the lid 510 may correspond to 12 assay channels 502, each portion of the lid 510 corresponding to an assay channel 502 comprising first and second buffer reservoir ports 550, 552, first and second barrier ports 554, 555, a sample port 560 and a sample extraction port 562. FIG. 5A illustrates a side elevation cross-sectional view taken along the line T-T of the tray of FIG. 5, which depicts a portion of the lid corresponding to a single assay channel (upper), portions V and W of which are enlarged (below) for clarity. FIG. 5B illustrates the enlarged views (V and W) shown in FIG. 5A, wherein the portion of the lid corresponding to an assay channel is disposed above a gel 580 comprising a sample well 582 and an extraction well 583. FIGS. 5A and 5B illustrate one example of a sample port 560 comprising of a tip landing zone 564 (located in an enlarged area of the sample port) and a smaller area 566 of the sample port 560, the smaller area 566 corresponding substantially with a desired location in the sample port 560, which corresponds with a location above a sample well 582 in a gel 580 disposed therebelow. The surface area of the tip landing zone 564 that does not overlap with the smaller area 566 may also be referred to herein as a "shelf". In certain embodiments, the area of the sample port 560 at the inner surface 512 of the lid is significantly less than the area of the sample port 560 at the outer surface 514 of the lid because the enlarged area accommodates tip splay, whereas the smaller area 566 of the sample port at the inner surface 512 can be reduced up to an area slightly larger than the projection area of the pipette tip.

FIGS. 5A and 5B also illustrates one example of tip registration features 568, 569 comprising a sloped surface for receiving a pipette tip. The sloped surface may be planar and/or curved, and at least partially defines the sample port orifice from the outer surface of the lid to the inner surface thereof. Since a purpose of the tip registration feature 568, 569 is to ensure consistent (and preferably perpendicular) transit of the pipette tip into the cassette, the slope or draft angle of the registration feature(s) 568, 569 preferably match(es) the draft angle of a pipette tip (e.g., 8°). In a preferred embodiment, tip registration features, 569 are present on a medial or front wall portion of the sample port 560, i.e., a sample port wall more proximate to the opposing side of the assay channel.

Referring further to FIGS. 5A and 5B, in operation, a pipette tip 570 comprising a sample would be lowered down (i.e., along a z-axis relative to the plane of the lid) by a liquid handling device into the tip landing zone 564 of a sample port 560. The tip 570 would then be moved laterally by the liquid handling device (i.e., along an x- and/or y-axis relative to the plane of the lid 510) until it contacts (i.e., registers) a registration feature 569. If the registration feature 569 is aligned with the smaller area 566 of the sample port 560 and the well 582 disposed in the gel 580 below, following registration, the contents of the tip 570 would be dispensed and the tip 570 would be removed from the sample port 560 by the liquid handling device.

FIGS. 5A and 5B also illustrate one example of a sample extraction port 562 comprising a second tip landing zone 565 and a smaller area of the sample extraction port, the smaller area of the sample extraction port 567 corresponding with a desired location in the sample extraction port 562, which corresponds with a location above a well 583 in a gel 580 disposed therebelow where a sample that has been subjected to electrophoresis is anticipated to be located. In operation, a sample that has been subjected to electrophoresis may be extracted from a gel 580 in the cassette by lowering a pipette tip 571 down (i.e., along a z-axis relative to the plane of the lid) into the second tip landing zone 565 of the sample extraction port 562. The tip 571 would then be moved laterally by the liquid handling device (i.e., along an x- and/or y-axis relative to the plane of the lid) until it contacts (i.e., registers) a registration feature 569*a*. If the registration feature 569*a* is aligned with the smaller area 567 of the sample extraction port 565 and the well 583 disposed in the gel 580 below, following registration, the tip 571 would be lowered further into the extraction well 582, the contents of the extraction well 583 would be aspirated and the tip 571 would be removed from the gel extraction well 582 and sample extraction port 562 by the liquid handling device.

In general, because the pipette tip has been positioned at a desired location corresponding to the extraction well, the pipette tip may be lowered into the extraction well without worry that the tip might puncture a wall defining the well, which may clog the tip and interfere with extraction of the sample and/or subsequent tip operations.

Figure 6:
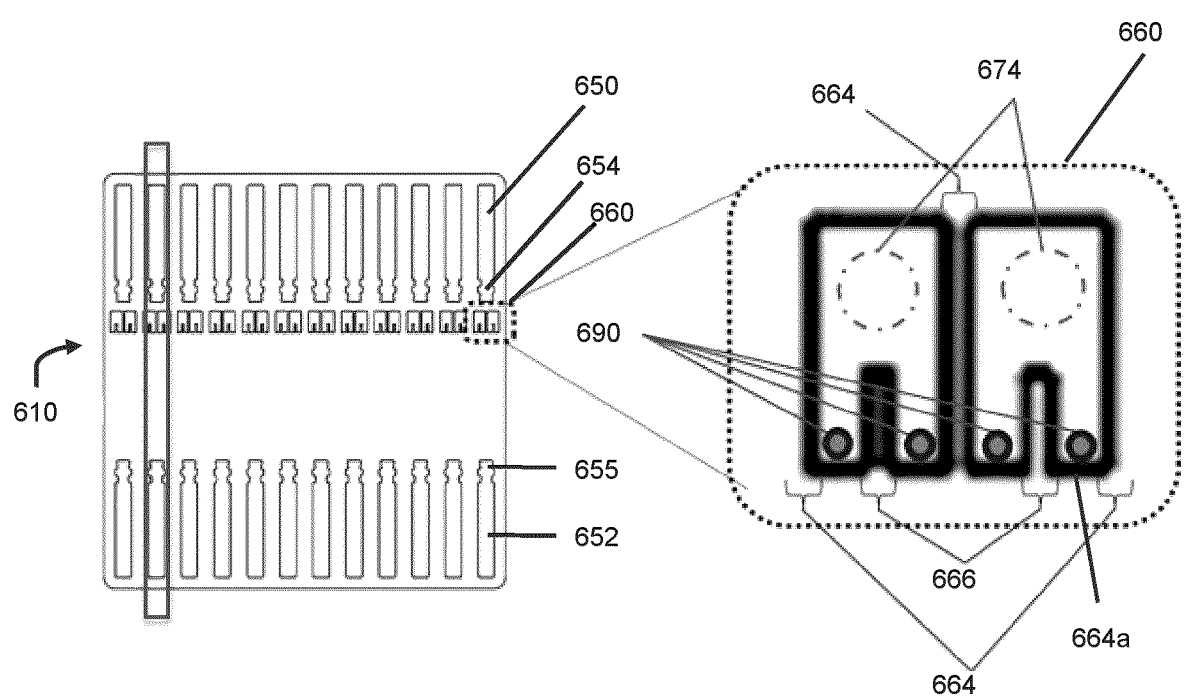
FIG. 6 is a top plan view of one embodiment of a lid portion of a cassette provided herein and an enlarged presentation of a sample port in the lid.

Referring to FIG. 6, which illustrates one embodiment of a lid provided herein (left), a lid 610 may be configured to correspond to a plurality of assay channels 602, each portion of the lid corresponding to an assay channel 602 comprising first and second buffer reservoir ports 650, 652 that are integral with first and second barrier ports 654, 655 and further comprising a plurality of sample ports 660, each of the sample ports comprising a tip landing zone 674, one or more registration features 664 and desired locations 690 corresponding to a sample well in a gel disposed in a cassette comprising the lid 610.

In general, the configuration of the sample ports provided in the lids of the cassettes provided herein facilitates standardization of the position of multiple mandrel engaged pipette tips by providing tip registration features against which said tips may register prior to descending into a pre-formed well in a gel disposed therebelow.

In the embodiment shown in FIG. 6, each portion of the lid 610 corresponding to an assay channel 602 comprises a rectangular sample port 660 comprising two desired locations 690 corresponding to two wells in a gel that may be disposed therebelow. These two desired locations 690 are illustrated as circles in FIG. 6, but may be otherwise shaped (e.g., rectangular or square). Two tip landing zones 674 are provided in each sample port 690, each being located in a distal portion of the sample port 660, opposite the desired locations 690. The registration features 664 in each sample port 664 are defined by walls of the sample port 660. An extension 666 projecting from the sample port wall opposite the tip landing zone 674 into the sample port 660 is provided to prohibit cross contamination between wells in the event of overflow. In operation, a pipette tip comprising a sample would be lowered a pre-determined distance (i.e., along a z-axis relative to the plane of the lid 610) by a liquid handling device into a tip landing zone 674 of a sample port 660. The tip would then be moved laterally by the liquid handling device along a first axis (for example, along an x-axis relative to the plane of the lid 610) until it contacts (i.e., registers) a first registration feature 664 (i.e., a wall of the sample port 660). The tip would then be moved along a second axis (for example, along a y-axis relative to the plane of the lid 610) until it contacts (i.e., registers) a second registration feature 664*a* (i.e., a second wall of the sample port). In one embodiment, if the second registration feature 664*a* is aligned with a desired location 690, following registration with the second registration feature 664*a*, the contents of the tip would be dispensed and the tip would be removed from the sample port 660 by the liquid handling device. In one embodiment, if the second registration feature 664*a* is aligned with a desired location 690, following registration with the second registration feature 664*a*, the tip would be lowered a pre-determined distance (i.e., along a z-axis relative to the plane of the lid 610) by a liquid handling device into a well disposed in a gel therebelow, the contents of the tip would be dispensed in the well and the tip would be removed from the sample port 660 by the liquid handling device.

In general, dispensing of the sample may be done above a well disposed below a sample port or, preferably, in a well disposed below a sample port. Because the pipette tip has been positioned at a desired location corresponding to the well, the pipette tip may be lowered into the well without worry that the tip might pucture a wall defining the well, which may clog the tip and interfere with dispensing and/or subsequent tip operations.

In general, additional tip registration features and additional desired locations corresponding to sample wells may be added to the sample ports of various embodiments of the cassette provided herein. Thereby allowing a single tip landing zone to correspond with a plurality of tip registration features and desired locations in a sample port.

Figure 7:
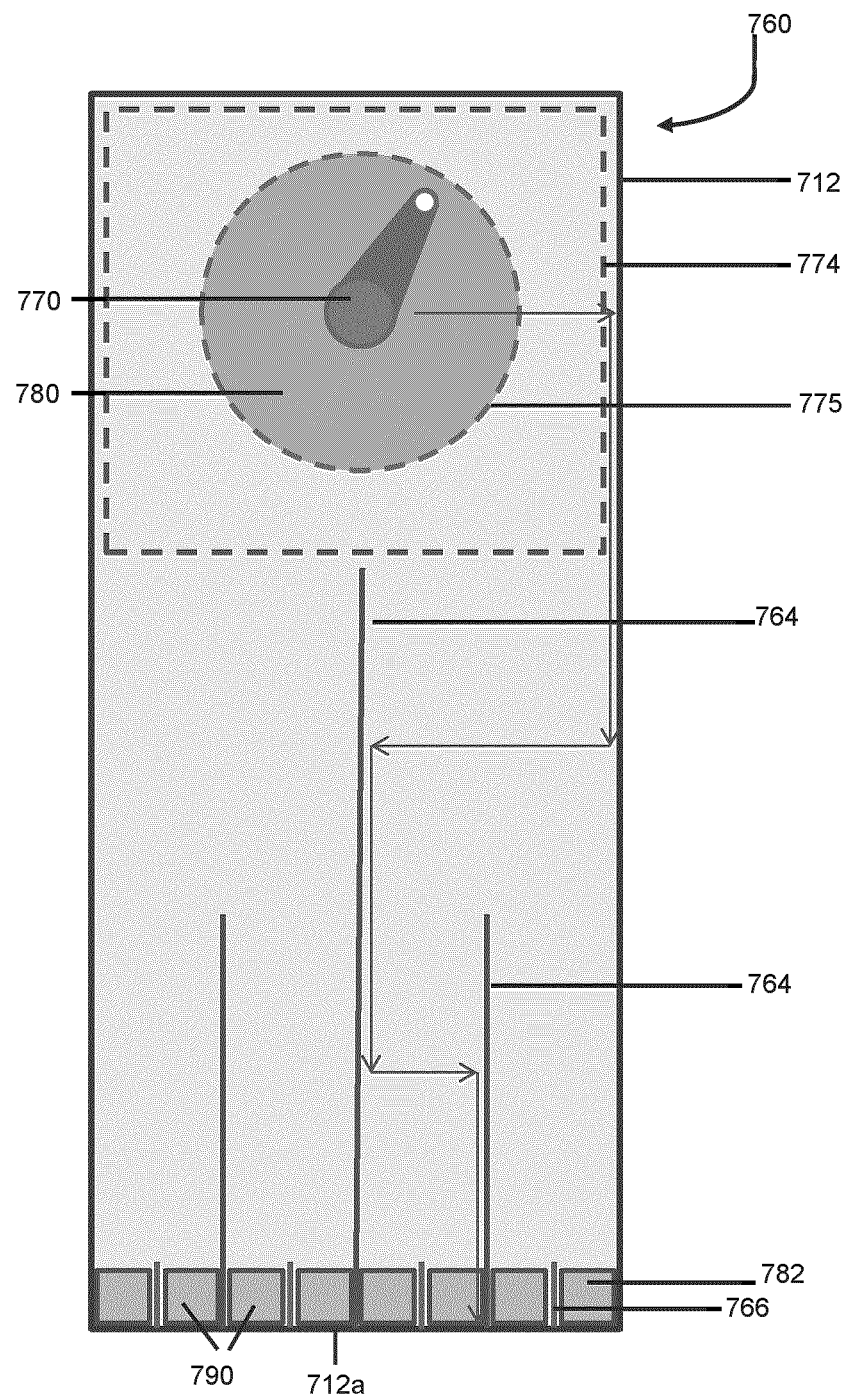
FIG. 7 is a top plan view of one embodiment of a sample port in a lid portion of a cassette provided herein, wherein a tip is shown being introduced into a tip landing zone in the sample port.
Figure 8:
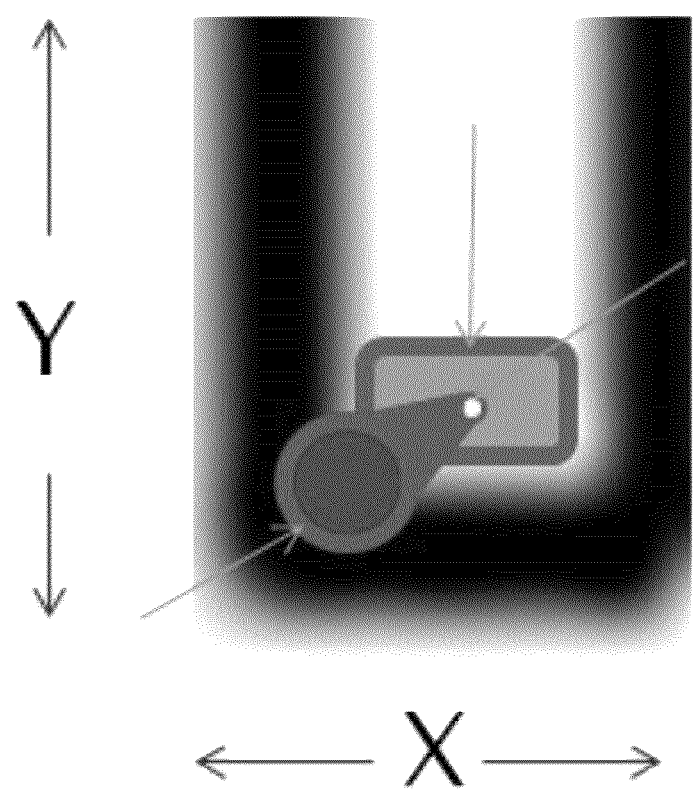
FIG. 8 is a top plan view of one embodiment of a sample port in a lid portion of a cassette provided herein, wherein a tip is shown being introduced into a the sample port.

For example, referring to FIG. 7, which illustrates one embodiment of a sample port in a lid provided herein, each sample port 760 may comprise a plurality desired locations 790 corresponding to a plurality of sample wells 782 in a gel disposed in a cassette comprising the lid. In this embodiment, a plurality of registration features comprising projections 764, 764a extend from a second wall 712a of the sample port, a first wall being adjacent to the plurality of desired locations 712. In operation, a pipette tip 770 comprising a sample would be lowered down a pre-determined distance (i.e., along a z-axis relative to the plane of the lid) by a liquid handling device into the tip landing zone 774 of the sample port 760. The tip 770 would then be moved laterally by the liquid handling device along a first axis (for example, along an x-axis relative to the plane of the lid, as illustrated in FIG. 8) until it contacts (i.e., registers) a first registration feature 712 (i.e., the first wall of the sample port). The tip would then be moved along a second axis (for example, along a y-axis relative to the plane of the lid) a pre-determined distance (e.g., a distance equal to the radius of a tip splay, referred to herein as a tip splay zone 775, which encompasses an area of maximum predicted tip splay) and then it is moved along the first axis towards a projection registration feature 764 (e.g., the longest projection extending from the second wall 712a). In FIG. 7, the trajectory of the tip is illustrated by arrows.

In general, the process of movement in the x- and y-axes until a tip registers with a registration feature may be repeated by registering a tip multiple times with a plurality of registration features until the tip registers with a registration feature that is aligned with a desired location at which point, the contents of the tip would be dispensed and the tip would be removed from the sample port by the liquid handling device. In FIG. 7, the registration feature aligned with the desired location 790 is the second wall 712a of the sample port 760.

In embodiments where tip registration features are projections 764, 764a that extend into the sample port 760 from a wall 712a of the sample port 760 opposite the tip landing zone 774, e.g., as shown in FIG. 7, each additional projection (e.g., 764a) would decrease in length, thereby allowing the previous projection (e.g., 764) to be used as a registration features in guiding the tip 770 from the relatively large landing zone 774, to the relative small desired location 790 corresponding to a well 782 that may be disposed therebelow. In one embodiment, the difference in length of neighbouring projections 764, 764a is at least as large as the total position variability that can be attributed to tip splay. For example, the tip landing zone 774 encompasses an area that is large enough to accommodate predicted tip splay (i.e., a tip splay zone 775) and the difference in length of subsequent registration features (i.e., projections 764, 764a) would be equal to or greater than the radius of the tip splay zone 775.

It will be understood that various configurations of registration features for guiding a pipette tip to a desired location in a sample port are encompassed by the cassettes disclosed herein.

Figure 9:
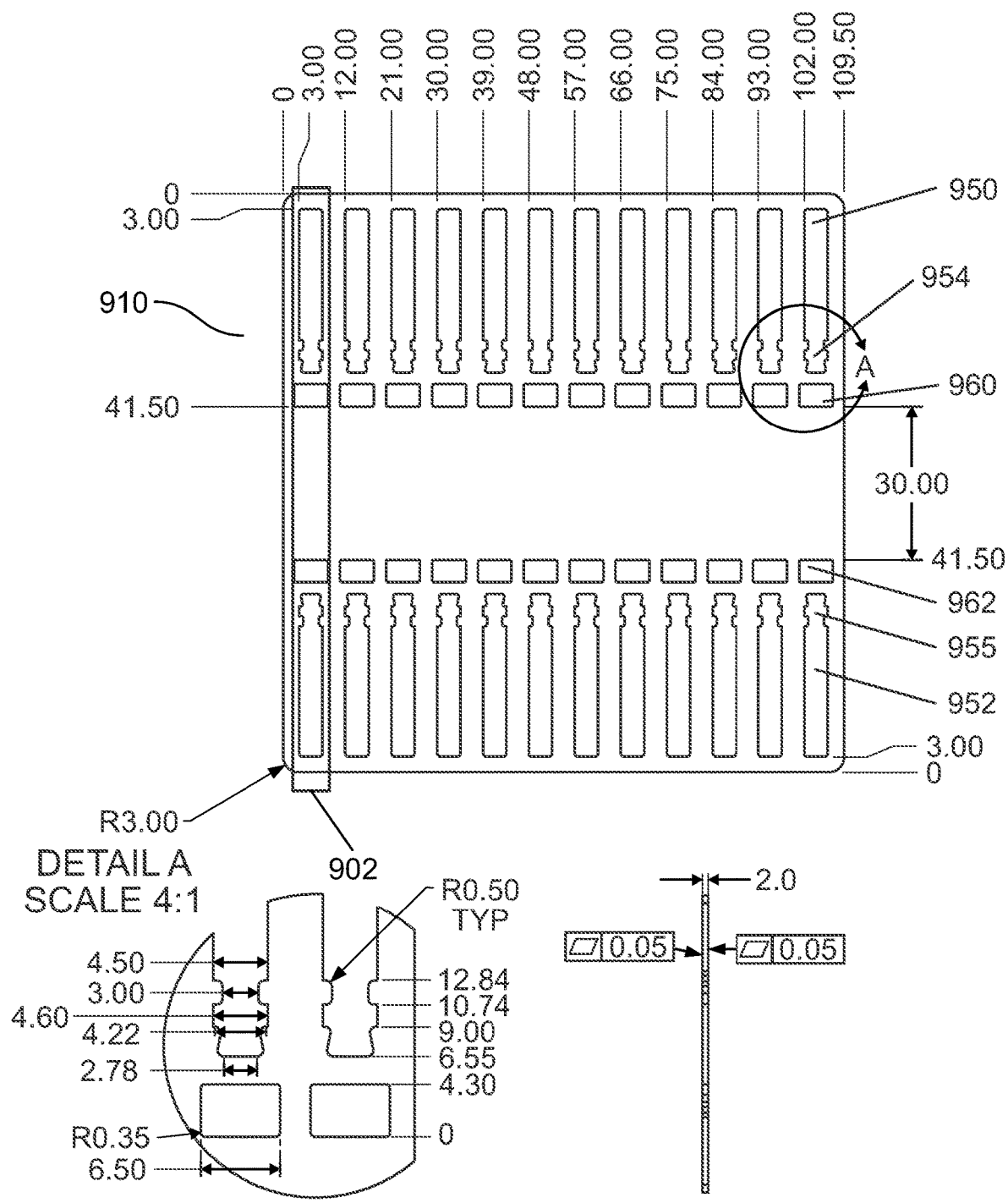
FIG. 9 is a top plan view of one embodiment of a lid portion of a cassette provided herein.

Referring to FIG. 9, an alternative embodiment of a lid 910 of a cassette provided herein is shown, the alternative embodiment comprising in each portion of the lid 910 corresponding to an assay channel 902 a first buffer reservoir port 950 that is integral with a first barrier port 954, a second buffer reservoir port 952 that is integral with a second barrier port 955, a sample port 960 and a sample extraction port 962. The first and second barrier ports 954, 955 are configured to receive first and second removable barriers (see detail A).

Figure 10:
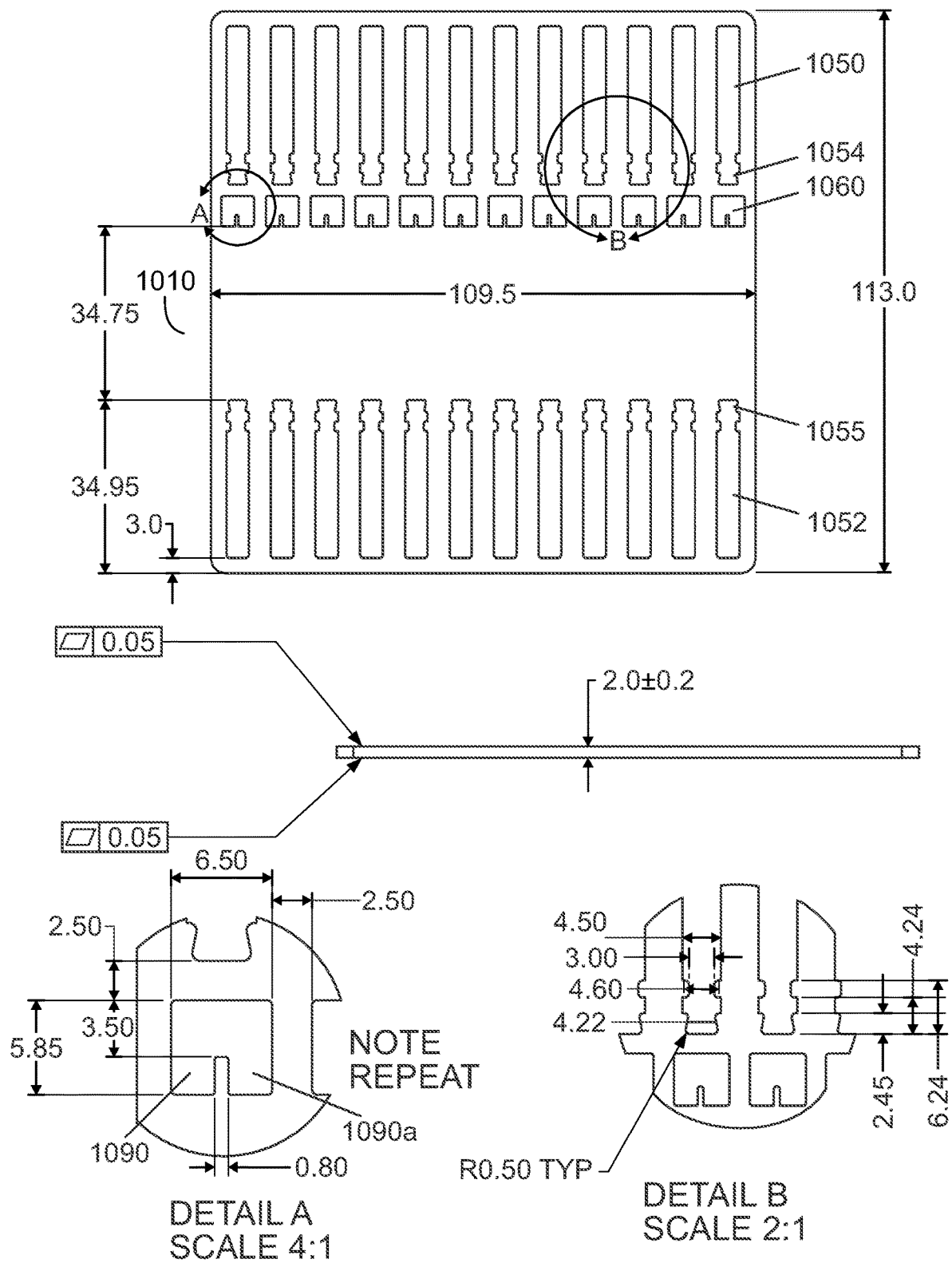
FIG. 10 is a top plan view of one embodiment of a lid portion of a cassette provided herein.

Referring to FIG. 10, an alternative embodiment of a lid 1010 of a cassette provided herein is shown, the alternative embodiment comprising in each portion of the lid 1010 corresponding to an assay channel 1002 a first buffer reservoir port 1050 that is integral with a first barrier port 1054, a second buffer reservoir port 1052 that is integral with a second barrier port 1055 and a sample port 1060. The sample ports 1060 are configured to comprise two desired locations 1090, 1090a corresponding to two wells in a gel that may be disposed therebelow.

Figure 11:
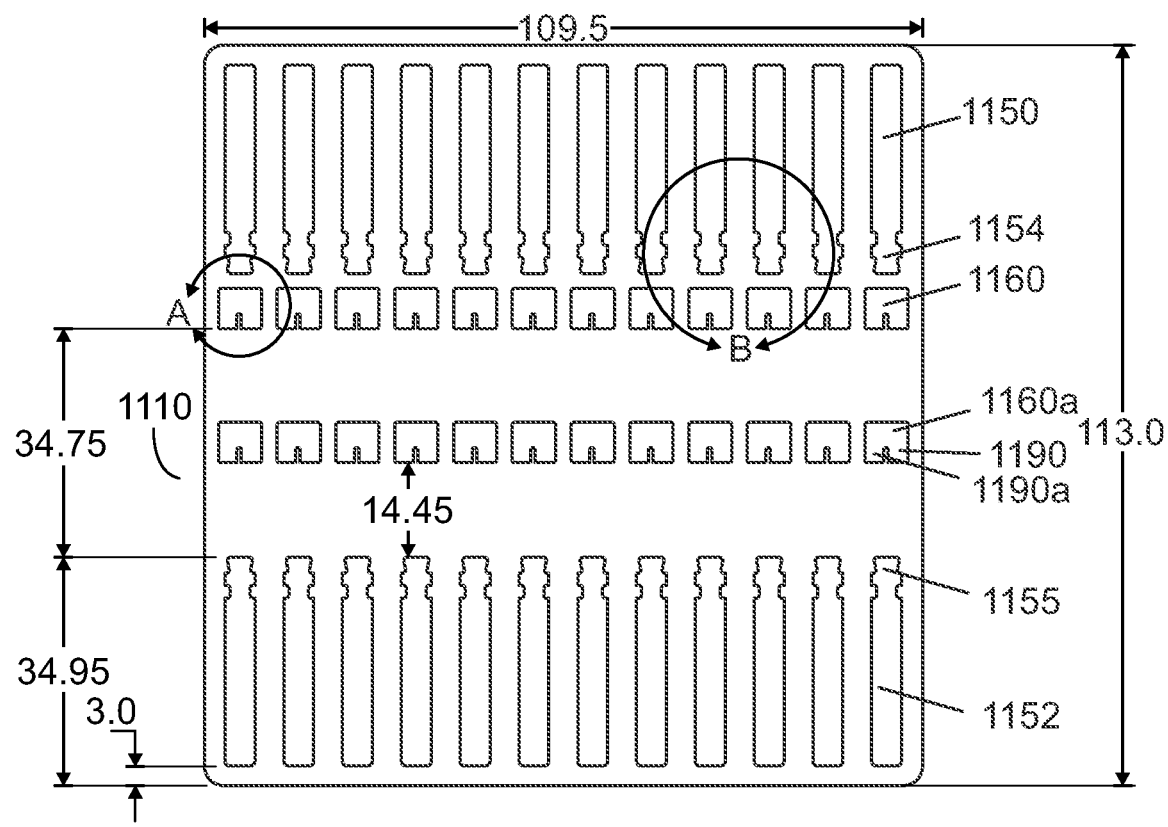
FIG. 11 is a top plan view of one embodiment of a lid portion of a cassette provided herein.

Referring to FIG. 11, an alternative embodiment of a lid 1110 of a cassette provided herein is shown, the alternative embodiment comprising in each portion of the lid 1110 corresponding to an assay channel 1102 a first buffer reservoir port 1150 that is integral with a first barrier port 1154, a second buffer reservoir port 1152 that is integral with a second barrier port 1155, a first sample port 1160, and a second sample port 1160a. The first and second sample ports 1160, 1160a are each configured to comprise two desired locations 1190, 1190a corresponding to two wells in a gel that may be disposed therebelow.

Dimensions provided in the figures are non-limiting examples only. In one preferred embodiment, an assembled cassette has a height of about 11.3 cm, a width of about 10.9 cm and a maximum depth of about 2.3 cm.

Manufacturing

In a second aspect, a method for manufacturing one or more embodiments of the cassette provided herein is disclosed. In one embodiment, the method comprises forming at least part of the tray and lid portions of the cassette from an optically neutral material, such as, for example, a clear thermoplastic, such as acrylic (e.g., poly methyl methacrylate) or non-autofluorescing polycarbonate. Methods of manufacturing articles from thermoplastics known in the art may be used to form at least part of tray and lid portions of the cassette, such as, for example, machining, injection molding, laser cutting or three dimensional printing.

In one embodiment, the method further comprises positioning a first removable barrier between the first buffer reservoir and the media channel in each of the assay channels of the formed tray and a second removable barrier between the second buffer reservoir and the media channel in each of the assay channels of the formed tray. In general, it is not necessary that the first and second removable barriers create a fluid impervious seal between the media channel and an adjacent buffer reservoir. Rather, it is only necessary that the removable barriers create a fluid barrier that substantially impedes cross migration of dissimilar fluids when there is not a material hydrostatic pressure differential across the barrier. When cross migration is no longer an issue due to, for example, a phase change in one of the fluids, the removable barriers is are longer needed can be disabled, e.g., by removal of the removable barriers from the assay channels.

Figure 12:
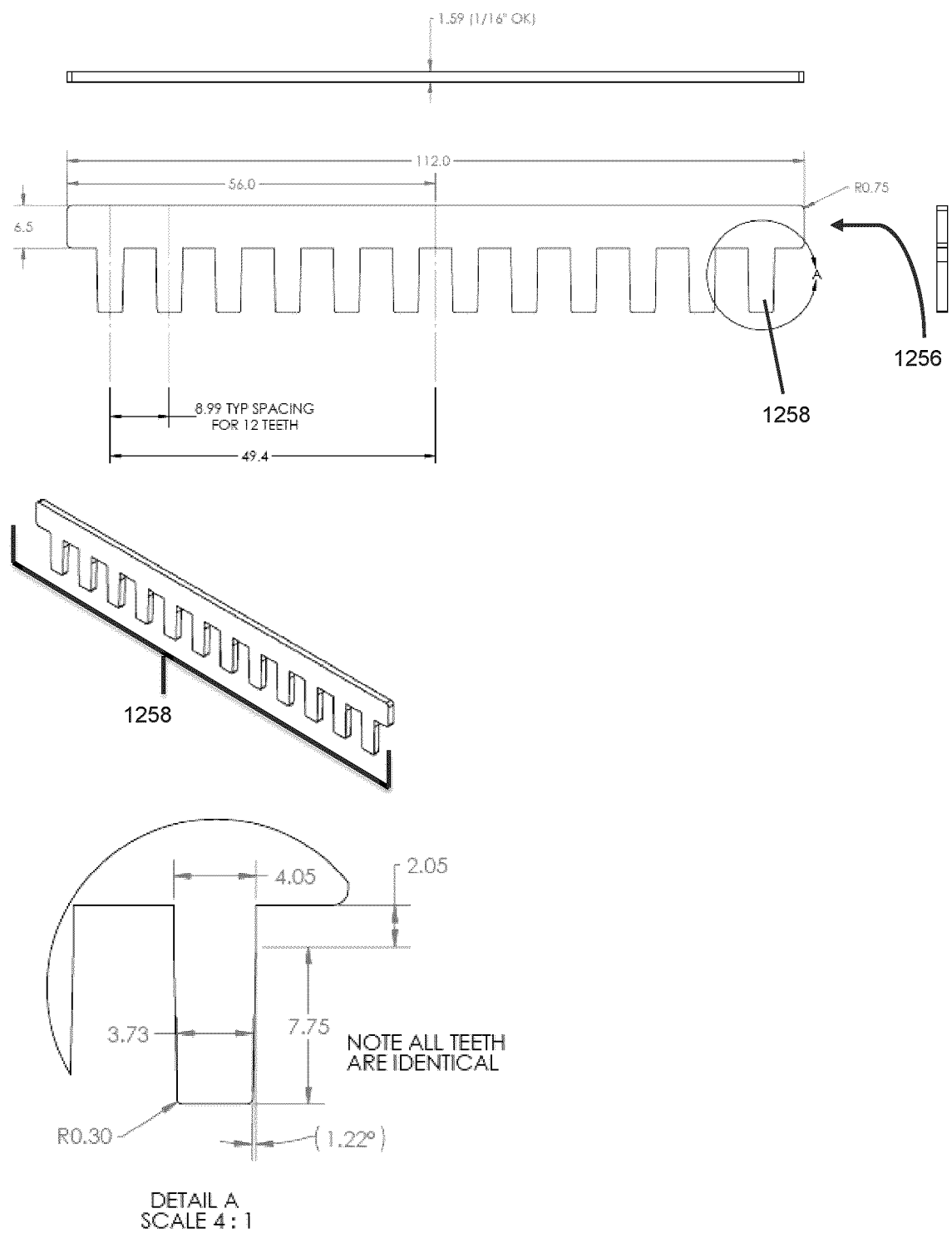
FIG. 12 depicts various views of one embodiment of a removable barrier for use in manufacturing various embodiments of a cassette provided herein.

Referring to FIG. 12, which illustrates one embodiment of a barrier 1256 for use in manufacturing various embodiments of the cassette provided herein, the barrier 1256 may have an elongated comb shape, each tooth 1258 in the barrier 1256 being sized and configured to engage the width and depth of an assay channel in the tray of a cassette. In a preferred embodiment, the number of teeth 1258 in a barrier 1256 corresponds to the number of assay channels in a cassette and the teeth 1258 are spaced along a longitudinal axis of the barrier 1256 such that they may be engaged in the assay channels of the cassette when the barrier 1256 is introduced into the cassette.

Figure 13:
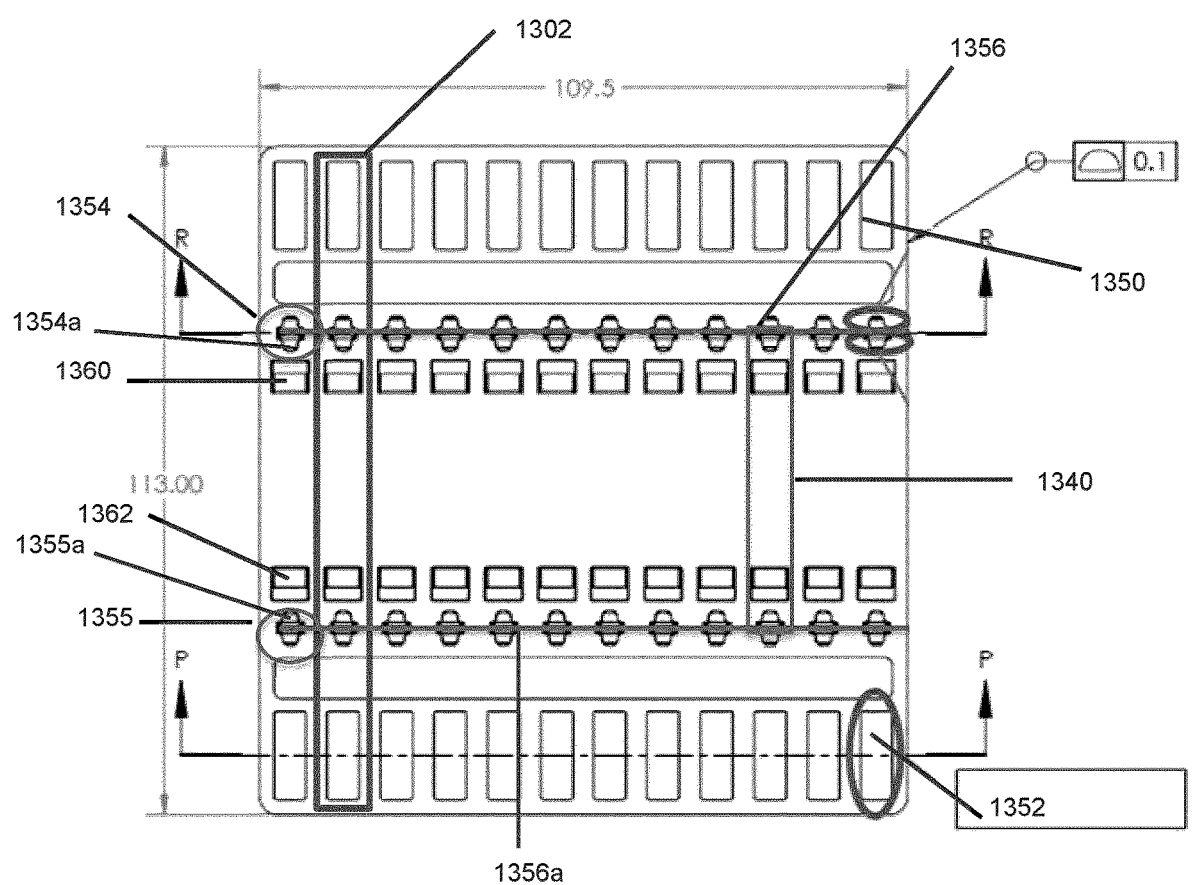
FIG. 13 is a top plan view of one embodiment of a cassette provided herein.
Figure 13A:
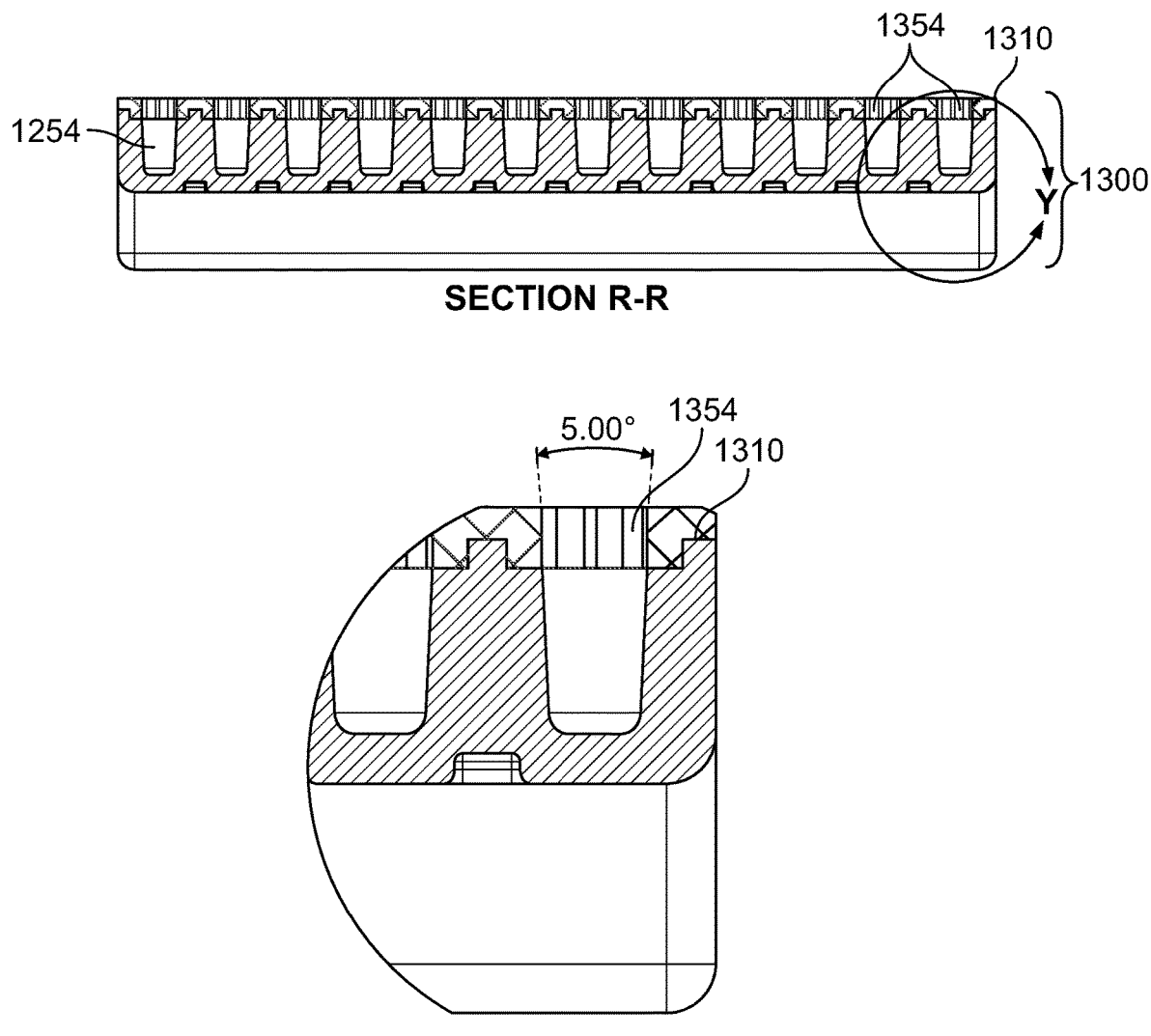
FIG. 13A is a side elevation in cross section taken substantially along the line R-R of FIG. 13.
Figure 13B:
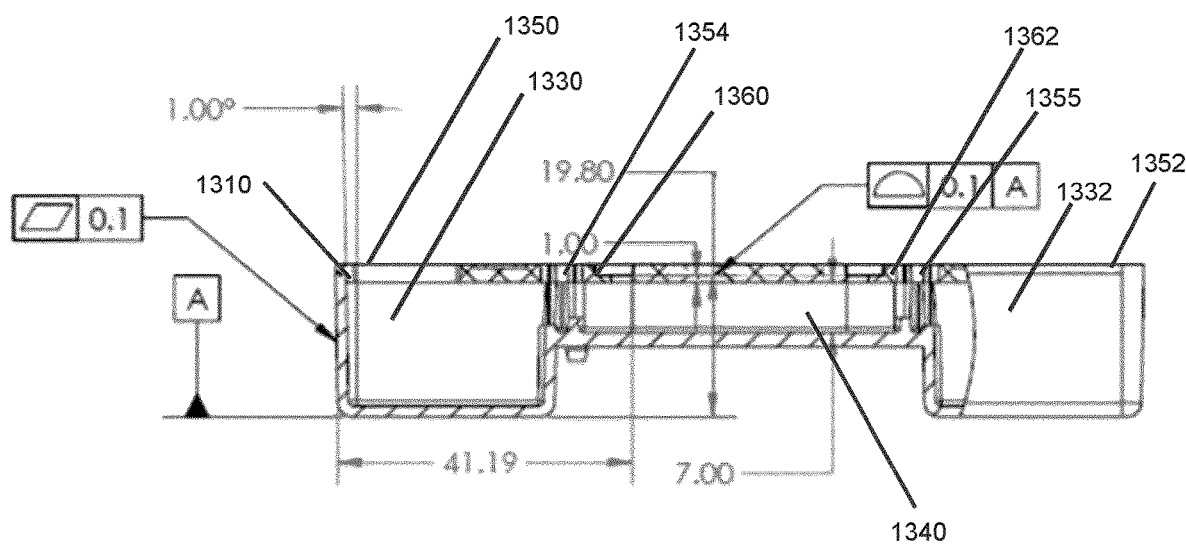
FIG. 13B is a side elevation in partial section of the cassette of FIG. 13.

Referring to FIG. 13, which illustrates a top plan view of one embodiment of a cassette provided herein, and 13B, which illustrates a side view of the cassette shown in FIG. 13, in one embodiment, a first removable barrier 1356 is positioned between the first buffer reservoir 1330 and the media channel 1340 in each of the assay channels 1302 and a second removable barrier 1356a is positioned between the second buffer reservoir 1332 and the media channel 1340 in each of the assay channels 1302. In one embodiment, positioning of the first and second barriers 1356, 1356a may be done directly into a tray portion of a cassette. Referring to FIGS. 13 and 13A, in a preferred embodiment, positioning of the first and second barriers may be done via barrier ports 1354 in a lid 1310 of a cassette 1300. In a preferred embodiment, the barrier ports 1354 may comprise one or more structures for engaging at least part of one or more of the first and second removable barriers.

Referring further to FIG. 13, in one embodiment, the method of manufacture further comprises introducing media into each media channel 1340 in the plurality of assay channels 1302 of the formed tray. In one embodiment, media may be introduced directly into the media channels 1340 of the formed tray. In one embodiment, media may be introduced into the media channels 1340 via one or more sample port 1360, one or more sample extraction port 1362, and/or one or more portion 1354a, 1355a of one or more barrier ports 1354, 1355, wherein the one or more portion 1354a, 1355a of one or more barrier ports 1354, 1355 is on a side of the first and/or second barrier, which abuts one or more media channels 1340.

Figure 14:
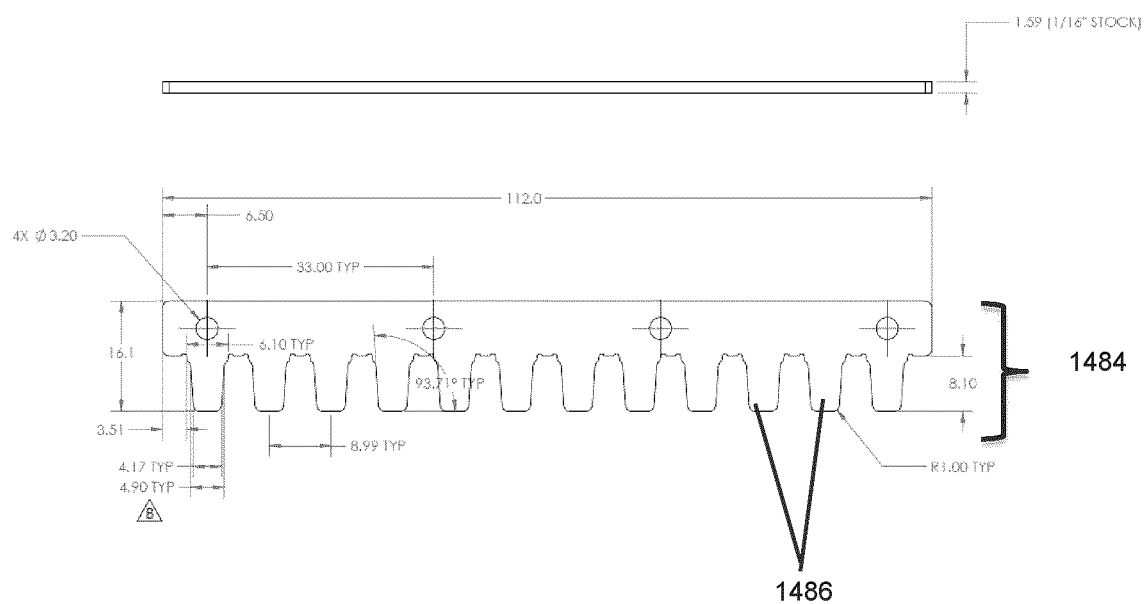
FIG. 14 depicts various views of one embodiment of a comb for use in manufacturing various embodiments of a cassette provided herein.

In one embodiment, the method further comprises positioning a comb into the introduced media in each media channel. Referring to FIG. 14, which illustrates one embodiment of a comb suitable for use in one embodiment of the method of manufacture provided herein, the comb 1484 may have an elongated shape, each tooth 1486 in the comb 1484 being sized and configured to form a well in each media channel of a cassette upon gelification of the media. In a preferred embodiment, the number of teeth 1486 in a comb 1484 corresponds to the number of assay channels in a cassette and the teeth 1486 are spaced along a longitudinal axis of the comb 1484 such that they may be engaged in the assay channels of the cassette when the comb 1484 is introduced into the cassette. Positioning of the comb 1484 may be done at a location in the assay channels where gel wells are desired. In a preferred embodiment, a second comb may be positioned in the assay channels comprising media at a position where sample extraction wells are desired.

Figure 15:
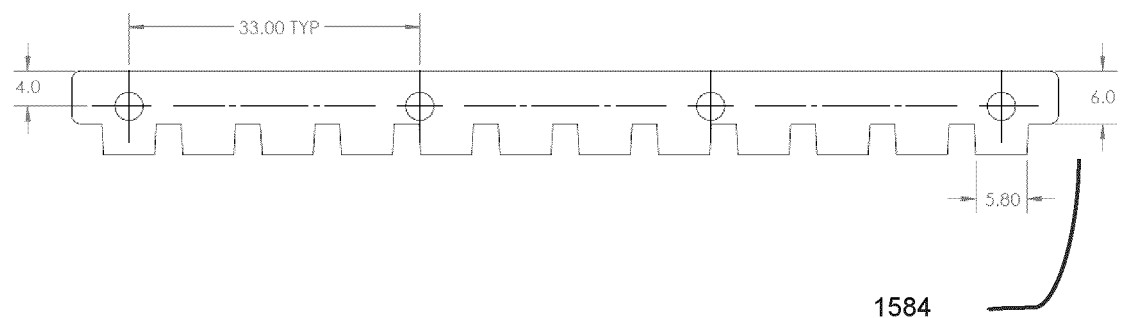
FIG. 15 depicts one embodiment of an additional comb for use in manufacturing various embodiments of a cassette provided herein.
Figure 15A:
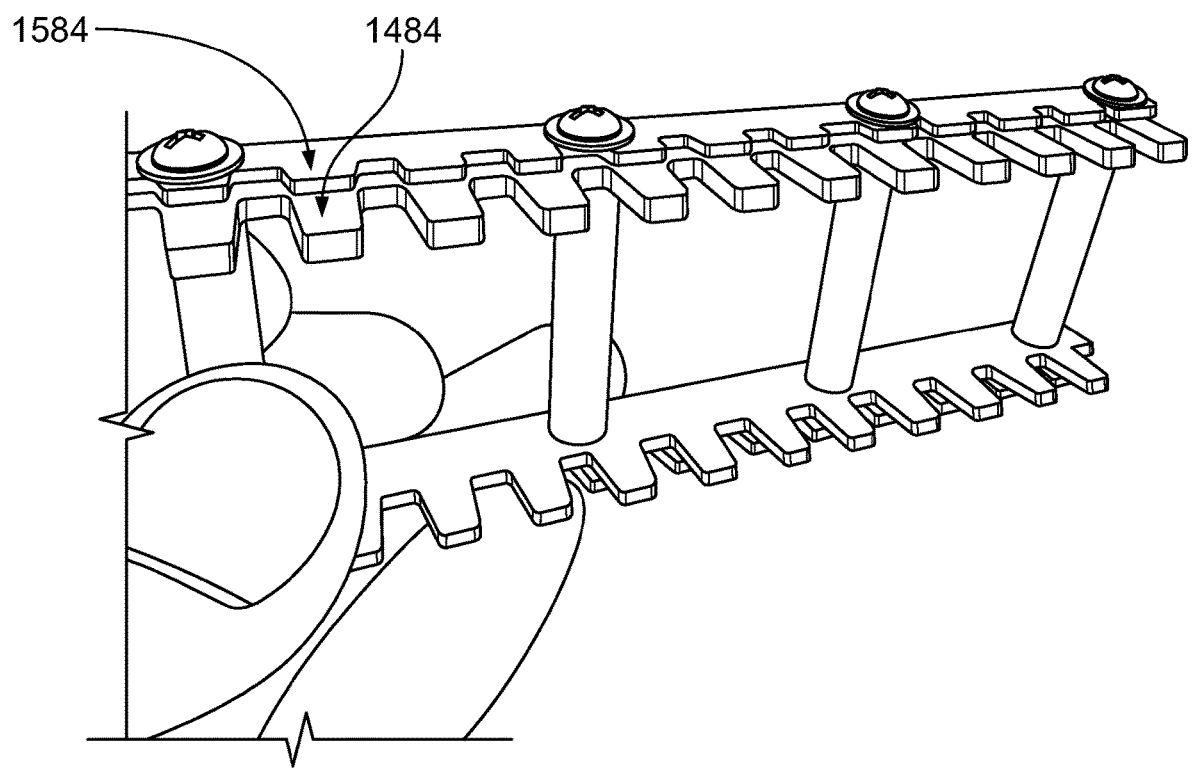
FIG. 15A is a photograph depicting the combs of FIG. 14 and FIG. 15 in combination.

In one embodiment, an additional comb 1584 may be combined with comb 1484 for use in various embodiments of the method of manufacture provided herein, as shown in FIG. 15A. In operation, combs 1484 and 1584 may be used to create a well in the plurality of media channels in various embodiments of the cassette provided herein, wherein the well comprises a standard well portion for receiving a dispensed sample that is created by a tooth 1486 in comb 1484 and further comprises a shelf. In one embodiment, such a shelf in the media of a media channel may be provided as an alternative to a tip landing zone that is manufactured in the lid of the cassette.

In one embodiment, the method further comprises introducing buffer into each first and second buffer reservoir in each assay channel of the formed tray. In one embodiment, buffer may be introduced directly into the first and second buffer reservoirs of the formed tray. In one embodiment, buffer may be introduced into the first and second buffer reservoirs via one or more buffer reservoir port and/or one or more portion of one or more barrier ports, wherein the one or more portion of one or more barrier ports is on a side of the first and/or second barrier, which abuts one or more buffer reservoirs.

In one embodiment, the method further comprises removing the comb from the introduced media after gelification of the introduced media and removing the barrier after gelification of the media. In a preferred embodiment, the barrier is easily removable, at least because it is not configured to form a water-tight seal with the assay channels. In this embodiment, introduction of the media and buffer may be carried out substantially simultaneously without mixing of the media and buffer, at least because the partial pressures on either side of the barrier caused, at least in part, by the fluid on either side of the barrier are nearly equivalent and opposing in force, thereby inhibiting mixing of the media and buffer. Simultaneous media and buffer introduction may be advantageous, at least for example, because it may speed manufacturing time.

In one embodiment, the method further comprises engaging the formed lid on the side walls of the formed tray, thereby creating a space between the floor of the formed tray and the lid, the space being occupied at least partially by the introduced media and the introduced buffer. The step of engaging the lid on the tray may be completed prior to or following introduction of media and/or buffer and prior to or following positioning of barrier(s) and/or comb(s). In one preferred embodiment, lid and tray portions of the cassette may be integral. In this embodiment, the lid and tray portions would be engaged to form a cassette prior to introduction of media and buffer and prior to positioning of barrier(s) and comb(s).

In one embodiment, once lid and tray portions are formed, the method of manufacturing various embodiments of a cassette provided herein further comprises: establishing one or more temporary barriers between one or more buffer receiving portions of the cassette and a media receiving portion of the cassette; substantially simultaneously the filling buffer receiving portion(s) and the media receiving portion to minimize hydrostatic pressure differentials across the temporary barrier; and removing the temporary barrier once the hydrostatic pressure differential decreases below a threshold value. Such methods, as previously intimated, are preferably carried out simultaneously for multiple assay channels so that the benefits of parallel processing can be fully realized.

Method of Using Cassette in an Electrophoresis Assay

In general, methods of using various embodiments of a cassette provided herein comprise generally directing a pipette tip to a sample port, for example by targeting a tip landing zone in the sample port; contacting the tip with a tip registration feature in the sample port; allowing the pipette tip to be guided along the tip registration feature to a desired location in the sample port corresponding with a well in a gel disposed in the cassette therebelow; and dispensing the contents of the pipette tip. Such method is preferably carried out simultaneously in a plurality of assay channels in the cassette. In operation, a gantry arm of a suitable liquid handling device comprises an array of mandrels, each comprising a pipette tip. The gantry arm is moved such that each pipette tip is moved downward into a tip landing zone of each sample port and then laterally in the sample port until each pipette tip contacts a tip registration feature, preferably each tip registers against the same portion of tip registration feature in each sample port, thereby ensuring uniform and consistent pipette transit into respective sample ports.

In one embodiment, the method comprises positioning the cassette in a liquid handling device. Liquid handling devices suitable for transferring liquids by pipette are known in the art. In this embodiment, one or more method steps are carried out by a liquid handling device. The method further comprises inserting a plurality of pipette tips into tip landing zones of the plurality of sample ports in a cassette. In a preferred embodiment, the plurality of pipette tips held by mandrels of the liquid handling device correspond to the plurality of sample ports and the relative spacing of the plurality of sample ports. The method further comprises moving the plurality of pipette tips inserted in the tip landing zones in one or more axes towards one or more of the tip registration features, the one or more axes being co-planar with the plane of the cassette lid. For example, the plurality of pipette tips inserted in the tip landing zones may be moved in an x-axis towards a plurality of registration features. The method further comprises registering the plurality of pipette tips against the one or more tip registration tip features, at least one of the one or more tip registration features per sample port being adjacent to the desired location in each of the sample ports. Registration of the tips with corresponding registration features in a sample port ensures that the tips are in the desired locations of each sample port, even if one or more tip on the liquid handling mandrel is splayed. The method further comprises dispensing a plurality of samples from the plurality of pipette tips registered against the registration features adjacent to the desired location in each of the sample ports. This step facilitates introduction of a sample into a well in an assay channel without worry of inserting the tip into the media because the tip(s) is not lowered into the well, rather, the tip remains above the well.

In one embodiment, the method further comprising engaging the cassette comprising the plurality of dispensed samples with electrodes and a power supply, thereby creating one or more electric fields in the cassette, the one or more electric fields being sufficient to case migration of the plurality of samples through the gelified media in the plurality of assay channels. Methods of electrophoretically treating samples (e.g., DNA, protein etc.) and tool for use of same are known in the art. In one embodiment, a single voltage may be applied to an entire cassette. In one embodiment, individual voltages may be applied to one or more assay channel in various embodiments of the cassette provided herein.

In a preferred embodiment, the method further comprises extraction of a migrated sample from the cassette, the cassette comprising a plurality of sample extraction ports. In this embodiment, the plurality of migrated samples are extracted from the cassette following exposure to the electric field. In one embodiment, the method of guiding pipette tips to the samples to be extracted is similar to the method of guiding pipette tips to the desired location in the sample port for sample introduction. For example, in one embodiment, the extraction comprises: inserting a second plurality of pipette tips into second tip landing zones of the plurality of sample extraction ports in the cassette. The liquid handling device then moves the second plurality of pipette tips inserted in the second tip landing zones in one or more axes towards one or more of the second tip registration features, the one or more axes being co-planar with the plane of the cassette lid, until the second plurality of pipette tips are registered against the one or more second tip registration tip features, at least one of the one or more second tip registration features per sample extraction port being adjacent to a second desired location in each of the sample extraction ports. As described above, this step adjusts for any tip splay in the second plurality of pipette tips. The method further comprises moving the registered second plurality of pipette tips downward into the gelified media below the second desired location in each of the sample ports and aspirating the plurality of migrated samples from the gelified media below the second desired location in each of the sample ports, thereby extracting the migrated samples. The plurality of pipette tips comprising the extracted, migrated samples are then retracting from the gelified media and the sample ports of the cassette.

Although the invention has been described with reference to certain specific embodiments, various modifications thereof will be apparent to those skilled in the art without departing from the purpose and scope of the invention as outlined in the claims appended hereto. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way. The disclosures of all prior art recited herein are incorporated herein by reference in their entirety.

We claim:

1. A cassette for use in parallel electrophoretic assays, the cassette comprising:
   a tray, the tray having a floor and two pairs of opposing side walls extending upwards from the floor, the tray at least partially defining a plurality of assay channels, each of the assay channels comprising:
      a first buffer reservoir;
      a second buffer reservoir; and
      a media channel, the media channel extending between, and in fluid communication with, the first and second buffer reservoirs;
   a lid, the lid adapted to engage the side walls of the tray, thereby creating a space between the tray floor and the lid, the lid comprising a plurality of ports, each of the ports extending from an outer surface of the lid to an inner surface of the lid, the plurality of ports comprising:
      a plurality of buffer reservoir ports for introducing and/or removing buffer;
      a plurality of sample ports for introducing a plurality of samples into the media channels, each of the plurality of sample ports comprising one or more tip registration features for guiding a pipette tip to a desired location in the sample port;
      wherein, when the lid is engaged with the tray, the buffer reservoir port is in fluid communication with one or more of the first and second buffer reservoirs, the plurality of sample ports are aligned with the plurality of media channels.

2. The cassette of claim 1, wherein the lid further comprises a plurality of media ports for introducing media into the media channels.

3. The cassette of claim 1 or 2, wherein the one or more tip registration features comprise at least one surface extending in one or more of x- and y-axes towards the desired location in the sample port, the x- and y-axes being in line with the plane of the lid.

4. The cassette of claim 3, wherein the at least one surface of the one or more registration features comprises a sloped surface for receiving a pipette tip.

5. The cassette of any one of claims 1 to 4, wherein each of the plurality of sample ports comprises a tip landing zone.

6. The cassette of claim 5, wherein the tip landing zone is adjacent to the desired location in the sample port.

7. The cassette of claim 6 wherein the at least one surface of the one or more registration features comprises a projection extending into the sample port from a wall in the sample port opposite the tip landing zone.

8. The cassette of any one of claims 1 to 7, further comprising a gel medium, the gel medium being disposed in the media channels of the tray, the gel medium in each media channel comprising a well for receiving a sample, wherein, when the lid is engaged with the tray, each well is aligned with the desired location in one of the plurality of sample ports.

9. The cassette of claim 8, further comprising a buffer, the buffer being disposed in the first and second buffer reservoirs.

10. The cassette of claim 8 or 9, wherein the gel medium in each media channel further comprises a tip landing zone adjacent to the well for receiving a sample.

11. The cassette of any one of claims 1 to 10, wherein the plurality of ports further comprises:
a plurality of barrier ports for positioning at least a portion of first and second barriers into each of the assay channels, wherein, when the lid is engaged with the tray, the plurality of barrier ports facilitate positioning of the first and second barriers between the first buffer reservoir and the media channel and the second buffer reservoir and the media channel, respectively.

12. The cassette of any one of claims 1 to 11, wherein the plurality of ports further comprises:
a plurality of sample extraction ports for extracting a plurality of samples from the media channel, each of the plurality of sample extraction ports comprising one or more tip registration features for guiding a pipette tip to a second desired location in the sample extraction port.

13. The cassette of any one of claim 12, wherein each of the plurality of sample extraction ports comprises a tip landing zone.

14. The cassette of claim 13, wherein the tip landing zone is adjacent to the desired location in the sample port.

15. The cassette of claim 12, wherein the gel medium in each media channel further comprises a second well for extracting a sample.

16. The cassette of claim 15, wherein the gel medium in each media channel further comprises a tip landing zone adjacent to the well for extracting a sample.

17. The cassette of any one of claims 1 to 16, wherein the plurality of assay channels comprises 6, 12, 24, 48 or 96 assay channels.

18. A method for manufacturing the cassette of claim 9, the method comprising:
forming the tray and lid from an optically neutral material;
positioning a first removable barrier between the first buffer reservoir and the media channel in each of the assay channels of the formed tray and a second removable barrier between the second buffer reservoir and the media channel in each of the assay channels of the formed tray;
introducing media into each media channel in the plurality of assay channels of the formed tray;
positioning a comb into the introduced media in each media channel, each tooth in the comb configured to form a well in each media channel upon gelification of the media;
introducing buffer into each first and second buffer reservoir in each assay channel of the formed tray;
removing the comb from the introduced media after gelification of the introduced media;
removing the barrier after gelification of the media;
engaging the formed lid on the side walls of the formed tray, thereby creating a space between the floor of the formed tray and the lid, the space being occupied at least partially by the introduced media and the introduced buffer.

19. The method of claim 18, wherein the engaging step is completed prior to the positioning of the first and second removable barriers, the introducing of media, the positioning of the comb and the introducing of the buffer.

20. The method of claim 19, wherein the first and second removable barriers do not sealably separate the first buffer reservoir from the media channel and the second buffer reservoir from the media channel, respectively, in each of the assay channels of the manufactured tray.

21. The method of claim 20, wherein the introduction of the media and the introduction of the buffer are carried out substantially simultaneously.

22. A method of using the cassette of claim 9, the method comprising:
positioning the cassette in a liquid handling device;
inserting a plurality of pipette tips in the tip landing zones of the plurality of sample ports, the plurality of pipette tips corresponding to the plurality of sample ports;
moving the plurality of pipette tips inserted in the tip landing zones in one or more axes towards one or more of the tip registration features, the one or more axes being co-planar with the plane of the cassette lid;
registering the plurality of pipette tips against the one or more tip registration features, at least one of the one or more tip registration features per sample port being adjacent to the desired location in each of the sample ports;
dispensing a plurality of samples from the plurality of pipette tips registered against the registration features adjacent to the desired location in each of the sample ports.

23. The method of claim 22, further comprising lowering the plurality of registered pipette tips into the corresponding wells for receiving a sample prior to dispensing the plurality of samples.

24. The method of claim 22 or 23, further comprising engaging the cassette comprising the plurality of dispensed samples with electrodes and a power supply, thereby creating one or more electric fields in the cassette, the one or more electric fields being sufficient to cause migration of the plurality of samples through the gelified media in the plurality of assay channels.

25. A method of using the cassette of claim 11, the method comprising:
positioning the cassette in a liquid handling device;
inserting a plurality of pipette tips in the tip landing zones of the plurality of sample ports, the plurality of pipette tips corresponding to the plurality of sample ports;

moving the plurality of pipette tips inserted in the tip landing zones in one or more axes towards one or more of the tip registration features, the one or more axes being co-planar with the plane of the cassette lid;

registering the plurality of pipette tips against the one or more tip registration features, at least one of the one or more tip registration features per sample port being adjacent to the desired location in each of the sample ports;

dispensing a plurality of samples from the plurality of pipette tips registered against the registration features adjacent to the desired location in each of the sample ports;

engaging the cassette comprising the plurality of dispensed samples with electrodes and a power supply, thereby creating one or more electric fields in the cassette, the one or more electric fields being sufficient to case migration of the plurality of samples through the gelified media in the plurality of assay channels;

extracting the plurality of migrated samples from the cassette following exposure to the electric field.

26. The method of claim 25, wherein the extracting comprises:

inserting a second plurality of pipette tips in the second tip landing zones of the plurality of sample extraction ports, the second plurality of pipette tips corresponding to the plurality of sample extraction ports;

moving the second plurality of pipette tips inserted in the second tip landing zones in one or more axes towards one or more of the second tip registration features, the one or more axes being co-planar with the plane of the cassette lid;

registering the second plurality of pipette tips against the one or more second tip registration features, at least one of the one or more second tip registration features per sample extraction port being adjacent to the second desired location in each of the sample extraction ports;

moving the registered second plurality of pipette tips downward into the gelified media below the second desired location in each of the sample ports;

aspirating the plurality of migrated samples from the gelified media below the second desired location in each of the sample ports; and retracting the second plurality of pipette tips from the gelified media and the sample ports of the cassette.

* * * * *